United States Patent
Namatame et al.

(10) Patent No.: US 7,805,163 B2
(45) Date of Patent: Sep. 28, 2010

(54) MOBILE COMMUNICATION TERMINAL, COMPUTER-READABLE RECORDING MEDIUM, AND COMPUTER DATA SIGNAL

(75) Inventors: Shigeru Namatame, Tachikawa (JP); Yoshihiro Goto, Hamura (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 744 days.

(21) Appl. No.: 11/497,901

(22) Filed: Aug. 2, 2006

(65) Prior Publication Data

US 2007/0032262 A1  Feb. 8, 2007

(30) Foreign Application Priority Data

Aug. 4, 2005 (JP) ............................. 2005-226327
Aug. 11, 2005 (JP) ............................. 2005-233571

(51) Int. Cl.
*H04B 1/38* (2006.01)
*H04N 7/14* (2006.01)

(52) U.S. Cl. ................. 455/556.1; 455/557; 348/14.02; 348/14.04

(58) Field of Classification Search ............. 455/426.1, 455/425, 462, 74.1, 550, 553, 554, 55.1, 455/556.2, 550.1, 552.1, 556.1, 557, 558, 455/418, 419, 414.1, 414.2, 414.3, 414.4; 370/312, 338, 329, 310, 349; 348/14.01, 348/14.02, 14.03, 14.04, 14.1, 14.11, 14.15
See application file for complete search history.

(56) References Cited

U.S. PATENT DOCUMENTS

| | | | |
|---|---|---|---|
| 6,999,792 B2 * | 2/2006 | Warren | ........................ 455/557 |
| 7,103,760 B1 * | 9/2006 | Billington et al. | ............... 713/1 |
| 2003/0103091 A1 | 6/2003 | Wong et al. | |
| 2004/0023683 A1 | 2/2004 | Mizuhiki et al. | |
| 2004/0055011 A1 | 3/2004 | Bae et al. | |
| 2004/0192403 A1 | 9/2004 | Lejman et al. | |
| 2005/0070327 A1 * | 3/2005 | Watanabe | ................. 455/552.1 |

(Continued)

FOREIGN PATENT DOCUMENTS

CN  1611058  4/2004

(Continued)

OTHER PUBLICATIONS

Office Action dated Jun. 24, 2008 issued for the counterpart Japanese Patent Application No. 2005-226327 (3 pages).

(Continued)

*Primary Examiner*—George Eng
*Assistant Examiner*—Nam Huynh
(74) *Attorney, Agent, or Firm*—Cohen Pontani Lieberman & Pavane LLP

(57) ABSTRACT

Upon detection to connection to a cradle, a control section of a mobile communication terminal accesses a storage section to determine whether setting information indicating operation settings of various functions is stored therein. When setting information is stored therein, the control section turns on power of the mobile communication terminal and controls the respective sections to execute an operation according to the setting information. While, no setting information is stored therein, the control section performs a charging operation without turning on power of the mobile communication terminal. Then, upon detection of release of connection to the cradle, the executed operation is finished based on the setting information.

6 Claims, 28 Drawing Sheets

U.S. PATENT DOCUMENTS

| | | |
|---|---|---|
| 2005/0085184 A1 | 4/2005 | Kaneda |
| 2005/0215296 A1* | 9/2005 | Fujihara et al. .......... 455/575.3 |
| 2007/0035664 A1* | 2/2007 | Kamada et al. ............. 348/565 |

FOREIGN PATENT DOCUMENTS

| | | |
|---|---|---|
| EP | 1 280 043 | 7/2002 |
| JP | 10-079908 | 3/1998 |
| JP | 11-103279 | 4/1999 |
| JP | 1020010068312 | 7/2001 |
| JP | 2002-199062 | 7/2002 |
| JP | 2003-188952 | 7/2003 |
| JP | 2003-309791 | 10/2003 |
| JP | 2004-282605 | 10/2004 |
| JP | 2004-364117 | 12/2004 |
| JP | 2005-073005 | 3/2005 |
| JP | 2005-073143 | 3/2005 |
| JP | 2005-086434 | 3/2005 |
| JP | 2005-101879 | 4/2005 |
| JP | 2005-123754 | 5/2005 |
| JP | 2005-140686 | 6/2005 |
| JP | 2005-323279 | 11/2005 |
| JP | 2006-108920 | 4/2006 |
| JP | 2006-129059 | 5/2006 |
| WO | WO 99/65209 | 12/1999 |
| WO | WO 03/056792 | 7/2003 |
| WO | WO 2005 013586 | 2/2005 |
| WO | WO 2005/022913 | 3/2005 |

OTHER PUBLICATIONS

Office Action dated Jun. 3, 2008 issued for the counterpart Japanese Patent Application No. 2005-233571 (3 pgs.).

* cited by examiner

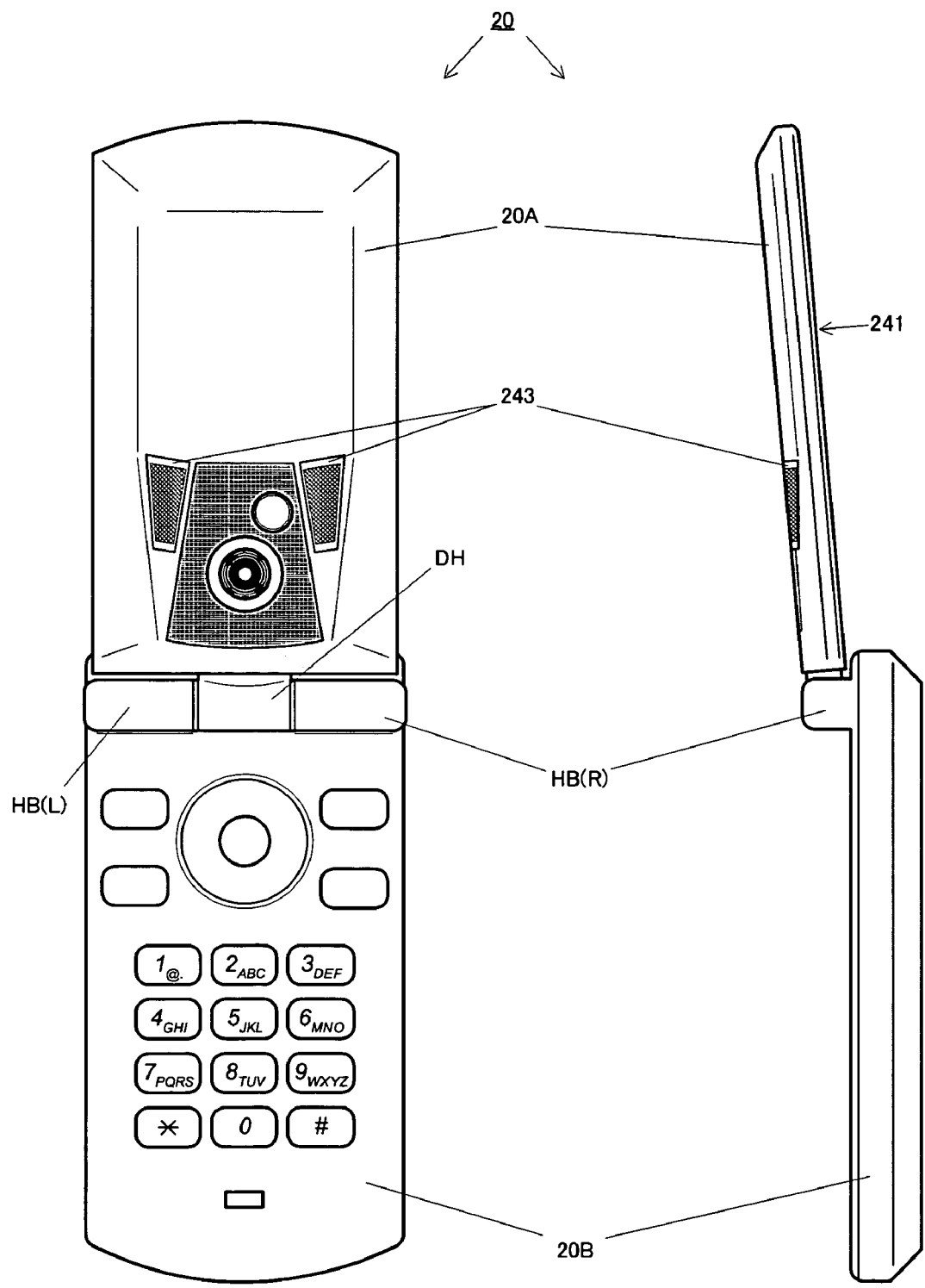
*FIG. 14A*          *FIG. 14B*

| APPLICATION | EXECUTION CONDITION | AUTOMATIC START-UP FLAG | OPTION |
|---|---|---|---|
| ⋮ | ⋮ | ⋮ | ⋮ |
| TELEVISION RECEPTION | MAIN SCREEN FACES FRONT··· | 1 | 1ch、··· |
| MUSIC PLAYBACK | MAIN SPEAKER FACES FRONT··· | 0 | FOLDER A ··· |
| RADIO RECEPTION | MAIN SPEAKER FACES FRONT··· | 0 | FM10ch、··· |
| SLIDE SHOW | MAIN SCREEN FACES FRONT··· | 0 | FOLDER B ··· |
| ⋮ | ⋮ | ⋮ | ⋮ |

EXECUTION CODITION INFORMATION C1
(SETTING INFORMATION S1)

FIG.22

| STYLE | APPLICATION |
|---|---|
| OPEN STYLE | STANDBY SCREEN DISPLAY |
| REVERSE-OPEN STYLE | AUDIO PLAYBACK |
| VIEW STYLE | TELEVISION RECEPTION |
| CLOSE STYLE | — |
| ⋮ | ⋮ |

EXECUTION CONDITION INFORMATION C2

FIG. 26A

| APPLICATION | OPTION |
|---|---|
| ⋮ | ⋮ |
| TELEVISION RECEPTION | 1ch, ⋯ |
| MUSIC PLAYBACK | FOLDER A⋯ |
| RADIO RECEPTION | FM10ch, ⋯ |
| SLIDE SHOW | FOLDER B⋯ |
| ⋮ | ⋮ |

SETTING INFORMATION S2

FIG. 26B

MOBILE COMMUNICATION TERMINAL, COMPUTER-READABLE RECORDING MEDIUM, AND COMPUTER DATA SIGNAL

BACKGROUND OF THE INVENTION

1. Field of the Invention

The present invention relates to a mobile communication terminal, computer-readable recording medium, and computer data signal, and, more particularly to a movable communication terminal suitable for executing various functions.

2. Description of the Related Art

In mobile communications such as cellular phones, the trends for multifunction devices are growing. For example, the cellular phone can double as a television receiver and an audio playback device.

With the progress in the multifunction and high performance of the device, many ways and means have been made to make full use of the performance of each function. For instance, the housing of a mobile communication terminal is changed in multiple kinds of styles, so that the style, which matches the function to be used, can be achieved.

This makes it possible to use one display screen in both portrait and landscape orientations and to realize a large-size screen display in landscape orientation that is appropriate for displaying a television broadcast in addition to the general screen display. Moreover, a large-size and high-quality speaker, which is difficult to be placed on the display surface side due to an increase in size of the display screen, is placed on an outer surface of the housing. Then, in playing back music, the housing is changed in such a way that the surface on which the speaker is placed is directed to the user.

As mentioned above, since restrictions on the arrangement of devices added to the mobile communication terminal can be solved by the changeable housing, the respective functions can be often implemented with the same performance as that of a device for exclusive use.

Accordingly, the mobile communication terminal can be employed for not only portable use but also domestic use as an information processor, home electronic appliance in some cases.

In consideration of battery consumption in this case, the mobile communication terminal is mounted on a charging base (cradle, stand) and is used with commercial power supply in many cases.

In view of the aforementioned use, for example, in Unexamined Japanese Patent Publication No. 2005-73005, a method is disclosed in which a device is mounted on a charging base and a television reception is performed by an antenna line connected to the charging base to obtain a good receiving condition.

The above method can provide the good receiving condition; however, manual operations such as channel selection relating to the television reception are required for users, resulting in low user convenience.

Accordingly, there has been desired a method for improving user convenience of the mobile communication terminal when the charging base is connected thereto. Particularly, in the mobile communication terminal having the housing that is changed in multiple kinds of styles, since such the mobile communication terminal includes many additional functions with high performance, there has been desired a method that makes full use of the performance of each function to allow improvement in user convenience.

In view of the aforementioned problem, the present invention has been made and an object of the present invention is to provide a mobile communication terminal having higher user convenience.

SUMMARY OF THE INVENTION

In order to achieve the above object, a mobile communication terminal according to a first aspect of the present invention has at least a reception section that receives a television airwave and outputs the airwave. The mobile communication terminal includes a setting storage section that stores setting information of an operation of the reception section; and a control section that controls an operation of the mobile communication terminal at the time when the mobile communication terminal is connected to a cradle. The control section causes the reception section to execute an operation based on the setting information of the setting storage section upon connection to the cradle.

In order to achieve the above object, a mobile communication terminal according to a second aspect of the present invention has a housing holdable in style of a plurality of kinds, a display section that displays an image, a speaker that outputs voice, and an application execution section that executes applications of a plurality of kinds. The mobile communication terminal includes a setting information storage section that stores setting information of the applications; a style determination section that determines a style held by the housing; and an application control section that controls execution of an application by the application execution section based on the style determined by the style determination section at the time when connection to a cradle is made. The application control section causes the application execution section to execute a predetermined application based on the setting information when the style determined by the style determination section is a specific style.

In order to achieve the above object, a computer-readable recording medium according to a third aspect of the present invention stores a program for causing a computer, which controls a mobile communication terminal, to execute the functions of detecting connection between the mobile communication terminal and a cradle; determining a style held by a housing of the mobile communication terminal; and executing an operation according to setting information of various functions of the mobile communication terminal and the determined style held by the housing at the time when connection to the cradle is detected.

In order to achieve the above object, a computer data signal according to a fourth aspect of the present invention embodied in a carrier wave represents a program for causing a computer, which controls a mobile communication terminal, to execute the functions of detecting connection between the mobile communication terminal and a cradle; determining a style held by a housing of the mobile communication terminal; and executing an operation according to setting information of various functions of the mobile communication terminal and the determined style held by the housing at the time when connection to the cradle is detected.

BRIEF DESCRIPTION OF THE DRAWINGS

These objects and other objects and advantages of the present invention will become more apparent upon reading of the following detailed description and the accompanying drawings in which:

FIG. 14A is a plane view showing an example in which the mobile communication terminal is formed in inverse-open style;

FIG. 14B is a side view showing an example in which the mobile communication terminal is formed in inverse-open style;

FIG. 22 is a view showing an example of execution condition information (setting information) stored in a storage section shown in FIG. 20;

FIG. 26A is a view showing an example of execution condition information according to the second embodiment of the present invention;

FIG. 26B is a view showing an example of setting information according to the second embodiment of the present invention;

DETAILED DESCRIPTION OF THE PREFERRED EMBODIMENTS

First Embodiment

A first embodiment of the present invention will explain a case in which the present invention is applied to a mobile communication terminal used in a cellular phone, PHS (Personal Handyphone System). Supposing that a mobile communication terminal 10 according to this embodiment has a television reception function that receives a television airwave and outputs the airwave in addition to a voice call function (phone function) as a basic function. Also, supposing that a predetermined charging base (cradle, stand) is used in charging a battery as an operation power source for the mobile communication terminal 10 or in driving the mobile communication terminal 10 with commercial power supply. In this embodiment, the mobile communication terminal 10 is mounted on a cradle 11 as shown in FIG. 1 to perform charging.

Figure 1:
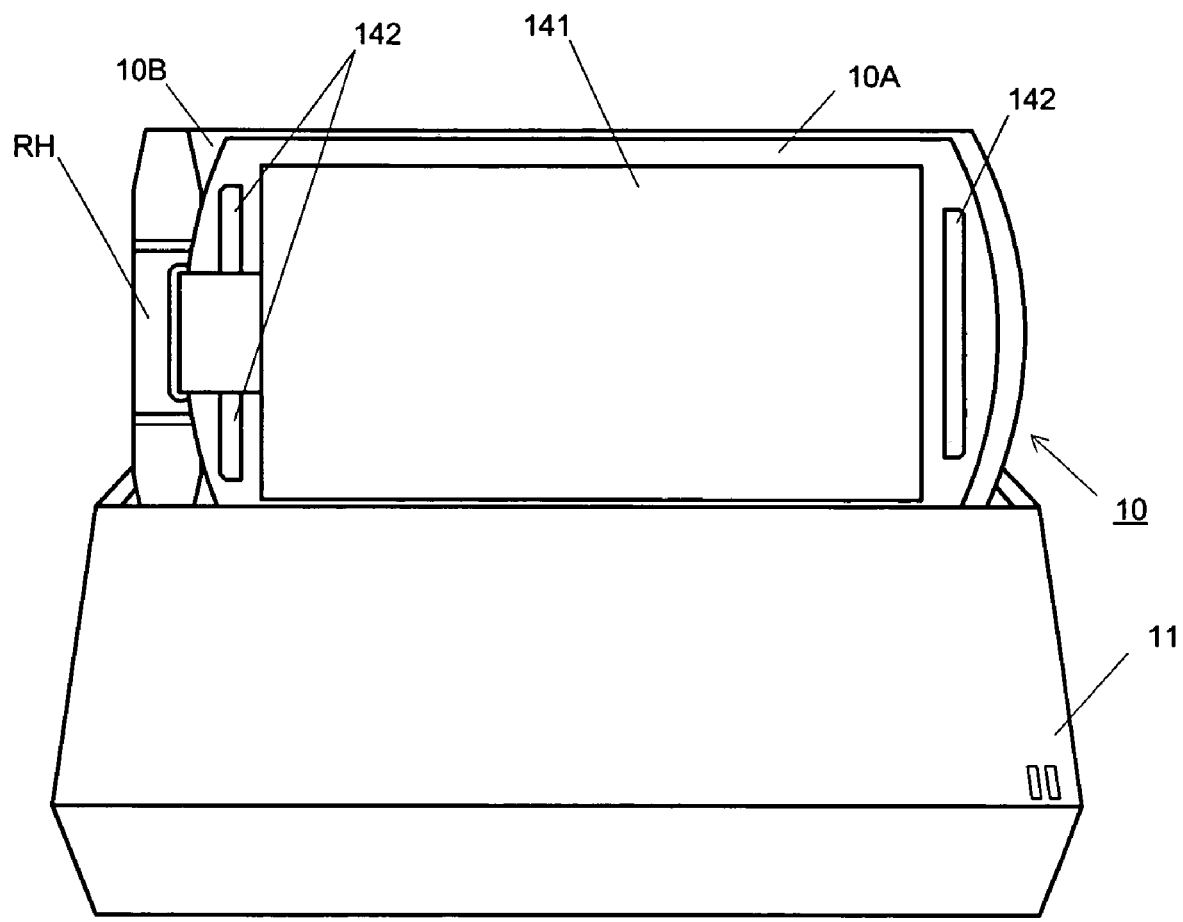
FIG. 1 is a view showing an external configuration of a mobile communication terminal and that of a cradle according to a first embodiment of the present invention.
Figures 2A, 2B:
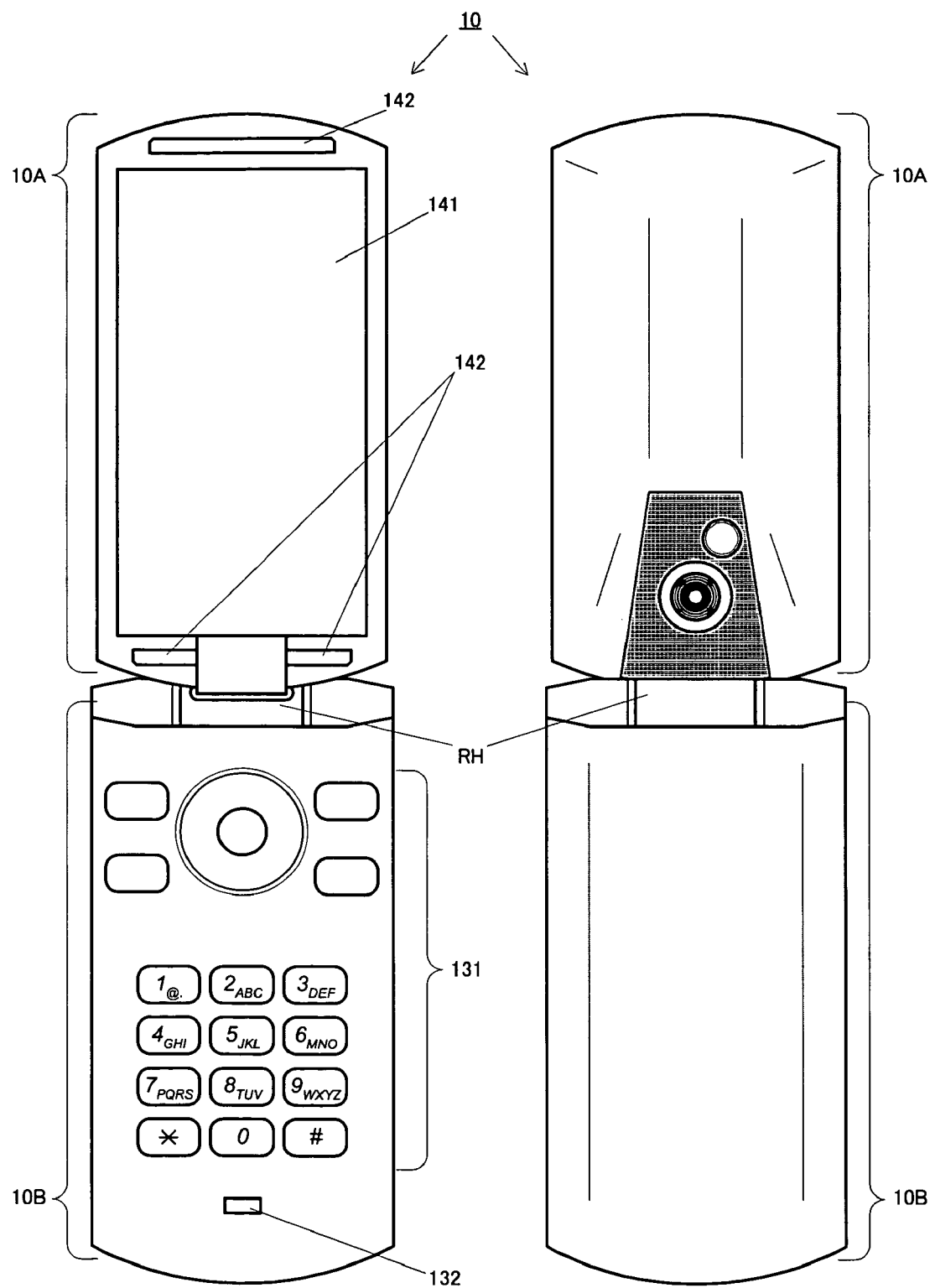
FIG. 2A is a view showing an external configuration of a main surface side of the mobile communication terminal according to the first embodiment of the present invention.
FIG. 2B is a view showing an external configuration of an outer surface side of the mobile communication terminal according to the first embodiment of the present invention.

In addition, the mobile communication terminal 10 according to this embodiment is configured to be foldable by two movable housing sections (housings 10A and 10B), which are connected by a rotational hinge RH as shown in FIGS. 1 and 2, and the mobile communication terminal 10 is mounted on the cradle 11 while being folded as illustrated in FIG. 1 to perform charging using the cradle 11.

Here, in this embodiment, it is assumed that the television reception function of the mobile communication terminal 10 is used while being mounted on the cradle 11. Accordingly, as shown in FIG. 1, the mobile communication terminal 10 is folded in such way to expose a display screen (display section 141) of the mobile communication terminal 10 and the mobile communication terminal 10 is mounted on the cradle 11 in such a way that the display surface is directed to the front side of the cradle 11 and that a display direction is correctly set.

In this case, the mobile communication terminal 10 is mounted on the cradle 11 in such a way that the longitudinal direction of the display screen corresponds to the horizontal direction in order to provide an appropriate display of the television screen. Accordingly, regarding connectors for making connection between the mobile communication terminal 10 and the cradle 10, one is placed on the side surface portion of the mobile communication terminal 10. Then, the other is placed on the mounting surface of the cradle 11 and these connectors are engaged with each other when the folded mobile communication terminal 10 is mounted on the cradle 11.

Figure 3:
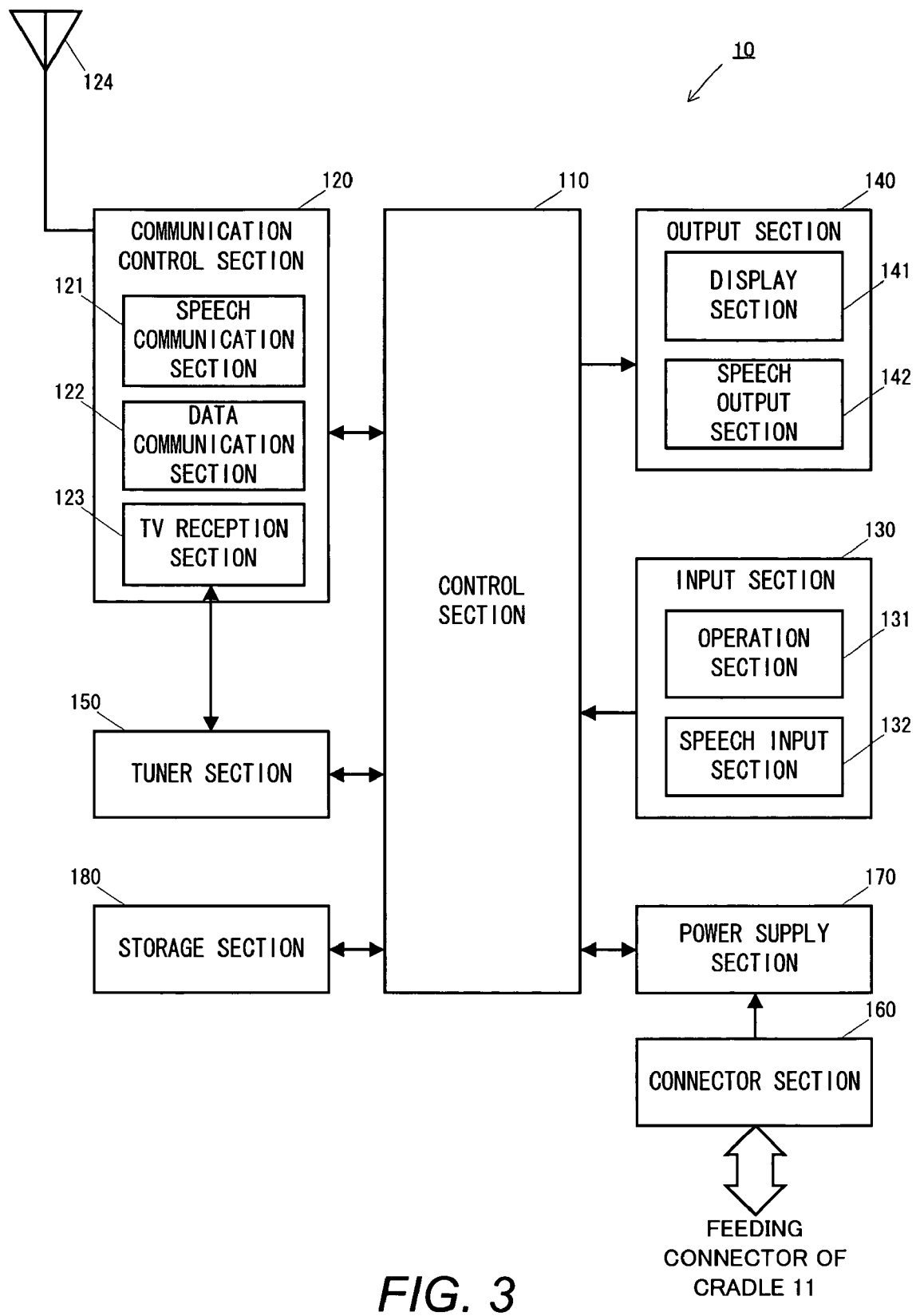
FIG. 3 is a block diagram showing an internal configuration of the mobile communication terminal illustrated in FIGS. 1 and 2.

The internal configuration of the aforementioned mobile communication terminal 10 will be explained with reference to FIG. 3. FIG. 3 is a block diagram showing the configuration of the mobile communication terminal 10. As shown in the figure, the mobile communication terminal 10 includes a control section 110, a communication control section 120, an input section 130, an output section 140, a tuner section 150, a connector section 160, a power supply section 170, a storage section 180, and the like.

The control section 110 includes, for example, a CPU (Central Processing Unit) and a predetermined storage device (RAM (Random Access Memory), etc.) as a work area, and controls the respective sections of the mobile communication terminal 10 and executes each processing described later based on a predetermined operation program stored in the storage section 180. It should be noted that the below-described components of the mobile communication terminal 10 are connected to the control section 110, respectively, and data exchange among the respective components is assumed to be performed via the control section 110.

The communication control section 120 includes, for instance, a predetermined radio communication circuit and performs radio communication through a predetermined antenna section 124. The communication control section 120 further includes a speech communication section 121, a data communication section 122, a television reception section 123, and the like.

The speech communication section 121 controls communication in connection with the telephone function (voice call function) of the mobile communication terminal 10. Here, for example, the speech communication section 121 controls the antenna section 124 to perform radio communication for a voice call via a telephone network such as a mobile communication network and to perform speech coding and decoding.

The data communication section 122 controls communication in connection with the data communication function of the mobile communication terminal 10. In this embodiment, for example, supposing that data communication is performed via an IP network such as the Internet, and the data communication section 122 controls the antenna section 124 to thereby perform radio connection to the data communication network and data transmission and reception.

It should be noted that the speech communication section 121 and data communication section 122 perform radio communication with a base station provided by a provider (so-called carrier) that offers mobile communication services to the mobile communication terminal 10.

The television reception section (TV reception section) 123 receives a television airwave through the antenna section 124 in cooperation with the tuner section 150 (to be specifically described).

The antenna section 124 includes, for example, a predetermined antenna circuit, an antenna line, etc, and is provided for at least both the mobile communication and the television airwave reception.

The input section 130 includes an operation section 131 and a speech input section 132 (FIG. 2A), and functions as an interface for the user to input data to the mobile communication terminal 10.

The operation section 131 includes predetermined buttons and keys (for example, character keys (ten keys), function buttons, directional keys, etc) (FIG. 2A) and causes an input signal to be input to the control section 110 according to a user operation.

The speech input section 132 includes, for example, a microphone, and inputs user speech at the speech communication.

The output section 140 includes a display section 141 and a speech output section 142 (FIG. 2) and outputs various information.

The display section 141 includes, for example, a liquid crystal display device, and displays various screens relating to the functions of the mobile communication terminal 10. In this embodiment, the display section 141 is used to output and display an image of the television broadcast received by the television reception function of the mobile communication terminal 10.

The speech output section 142 includes, for example, a speaker, and outputs sound of the television broadcast in addition to a ring alert and a phone voice at the speech communication.

The tuner section 150 includes a tuner circuit for television broadcast reception and performs channel selection for a television broadcast to be received in cooperation with the control section 110.

The connector section 160 is a connector for making connection between the cradle 11 and this connector section and includes a receiving terminal. The connector section 160 is paired with a feeding connector provided in the cradle 11, and these connectors are connected to each other, so that power is received from the cradle 11 and supplied to the power supply section 170 through the connector section 160.

The power supply section 170 includes a predetermined power circuit, a rechargeable buttery and the like, and charges the battery with the commercial power supplied via the connector section 160 connected to the cradle 11, and supplies power sent from the cradle 11 and power stored in the battery to each component of the mobile communication terminal 10.

The storage section 180 includes a predetermined storage device such as a ROM (Read Only Memory), a flash memory, etc., and stores data necessary for executing each processing and data generated by execution of each processing, in addition to operation programs executed by the control section 110. Particularly, in this embodiment, the storage section 180 stores setting information (to be specifically described) on the television reception function of the mobile communication terminal 10.

Figure 4:
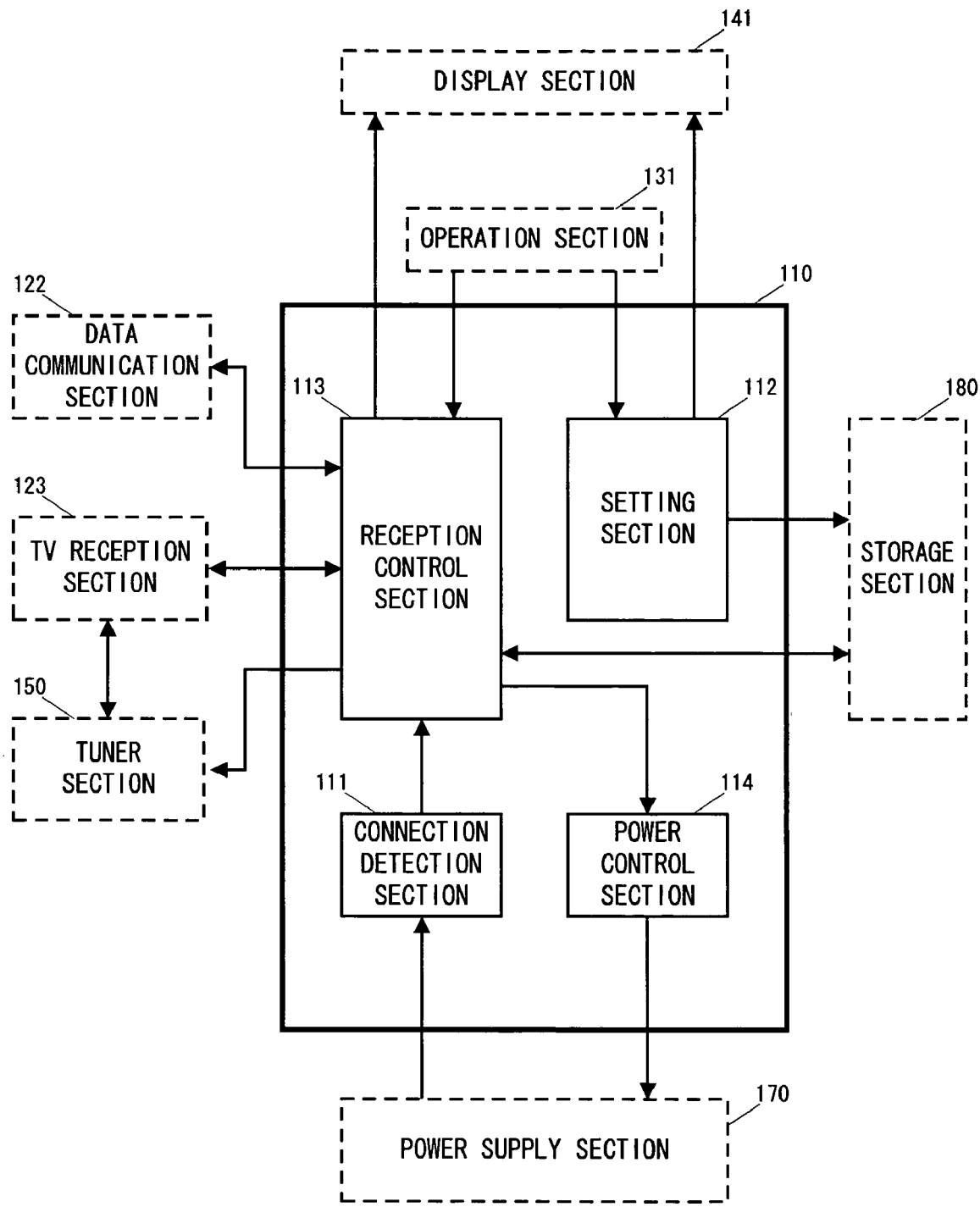
FIG. 4 is a functional block diagram showing a functional configuration implemented by a control section illustrated in FIG. 3.

The operation programs stored in the storage section 180 include an operation program for implementing each processing to be described later in addition to an arbitrary basic program that controls the base operation of the mobile communication terminal 10. The control section 110 executes these operation programs to thereby implement the below-described processing by the mobile communication terminal 10. Namely, execution of the operation programs stored in the storage section 180 causes the control section 110 to function as components shown in FIG. 4. As shown in the figure, the control section 110 functions as a connection detection section 111, a setting section 112, a reception control section 113, and a power control section 114.

The connection detection section 111 detects connection and disconnection between the mobile communication terminal 10 and the cradle 11 in cooperation with the power supply section 170.

The setting section 112 performs processing on various settings (hereinafter referred to as "reception setting") relating to the television reception function in cooperation with the operation section 131 and the storage section 180. The setting section 112 creates setting information based on the user operation of the operation section 131, changes setting, and stores the result in the storage section 180. It should be noted that the setting section 112 creates various screens necessary for reception setting and causes the result to be displayed on the display section 141.

The reception control section 113 controls the communication control section 120 and the tuner section 150 based on the setting information to execute the television reception operation based on the setting information. It should be noted that control by the reception control section 113 is implemented by executing an application program of the television reception function. Accordingly, the reception control section 113 performs processing relating to display of the television image and sound playback in cooperation with the output section 140, in addition to control of the communication control section 120 and the tuner section 150. Moreover, the reception control section 113 acquires, for instance, an EPG (electronic program guide) via the Internet in cooperation with the data communication section 122.

The power control section 114 controls the power supply section 170 based on the setting information to turn on and off the mobile communication terminal 10.

In this embodiment, the aforementioned functional configuration is logically implemented by the control section 110. However, the aforementioned functions are configured by a dedicated circuit such as an ASIC (Application Specific Integrated Circuit), so that these functions may be implemented by the physical configuration. It should be noted that the control section 110 performs a timer operation for time display, thereby making it possible to acquire current time information at any time.

The aforementioned components of the mobile communication terminal 10 are those necessary for implementing the present invention and other components necessary for the basic functions as the mobile communication terminal and components necessary for various additional functions may be provided as required.

An explanation will be next given of the cradle 11. As mentioned above, when the mobile communication terminal 10 is mounted on the cradle 11, the cradle 11 performs charging. The cradle 11 includes a housing on which the mobile communication terminal 10 is mountable as illustrated in FIG. 1, and an outlet and a cord for commercial power to acquire commercial power. Moreover, on the surface where the mobile communication terminal 10 is mounted, the feeding connector is provided at a position where engagement with the connector section 160 is made when the mobile communication terminal 10 is mounted thereon. When connection between these connectors is established by mounting the mobile communication terminal 10 on the cradle 11, acquired commercial power is sequentially supplied to the mobile communication terminal 10.

Figure 5:
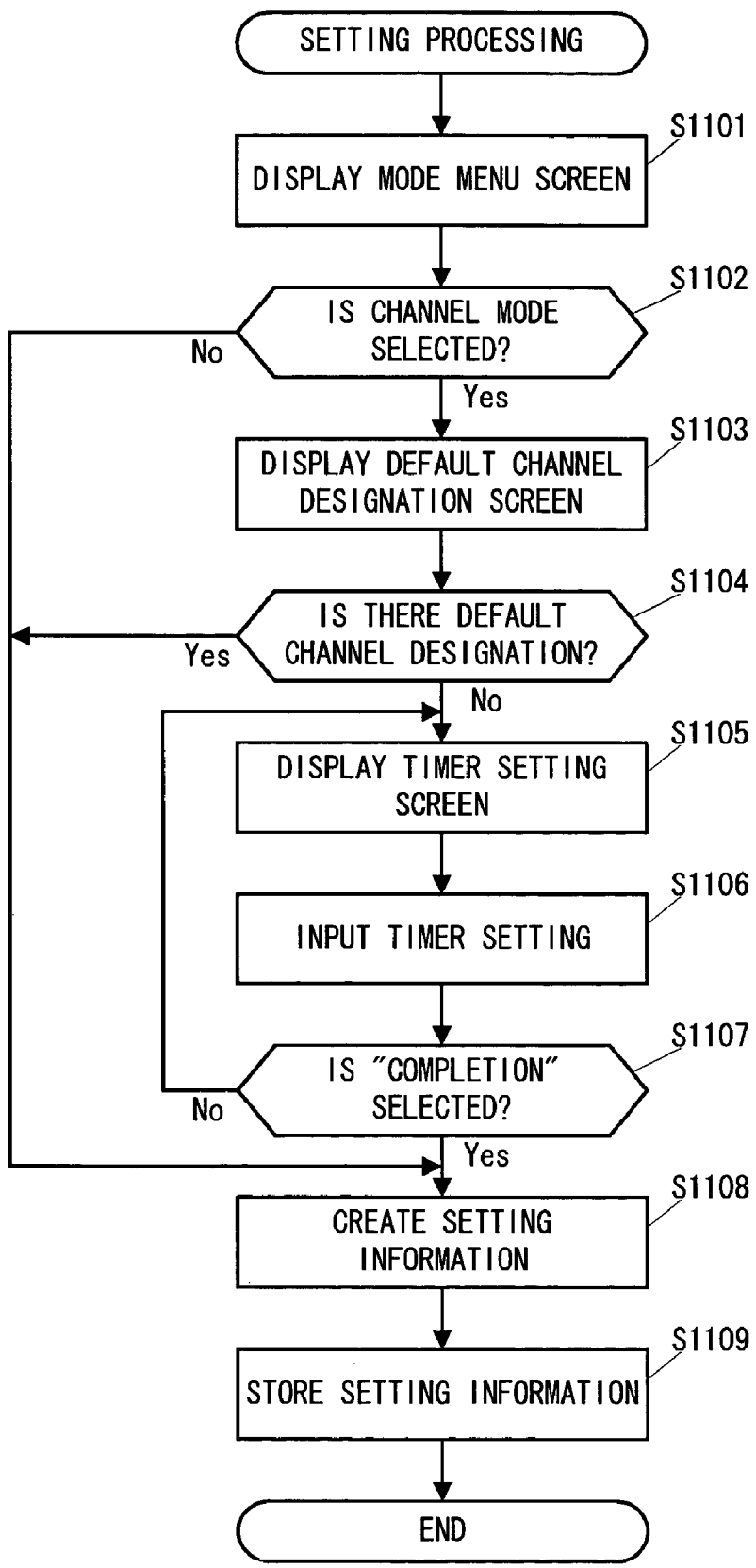
FIG. 5 is a flow chart explaining "setting processing" according to the first embodiment of the present invention.

The following will explain an operation by the mobile communication terminal 10 having the aforementioned configuration. First of all, "setting processing", which is executed when the mobile communication terminal 10 performs reception setting, will be explained with reference to a flow chart shown in FIG. 5. This "setting processing" is started at the time when the user operates the operation section 131 to instruct the start of setting.

When processing is started, the setting section 112 displays a "mode menu screen" for causing the user to select a setting mode on the display section 141 (step S1101). In this embodiment, two types of setting modes, a "channel mode" and a "program guide mode" are assumed. The channel mode is a mode that sets a viewing channel and time by a user manual operation and the program guide mode is a mode that performs setting based on the electronic program guide provided via the Internet.

Figure 6A:
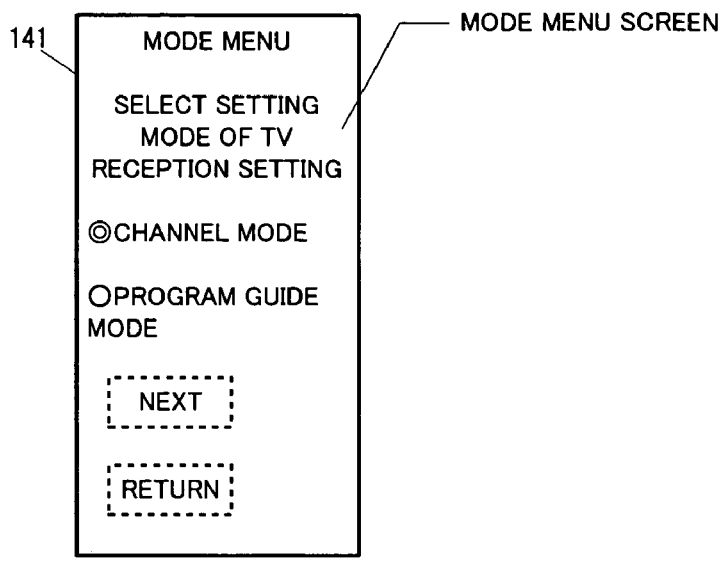
FIG. 6A is a view showing a display example of a "mode menu screen"

As illustrated in FIG. 6A, on the "mode menu screen", either mode is selectably displayed. The user operates the operation section 131 according to the display and selects a desired setting mode.

Figure 6B:
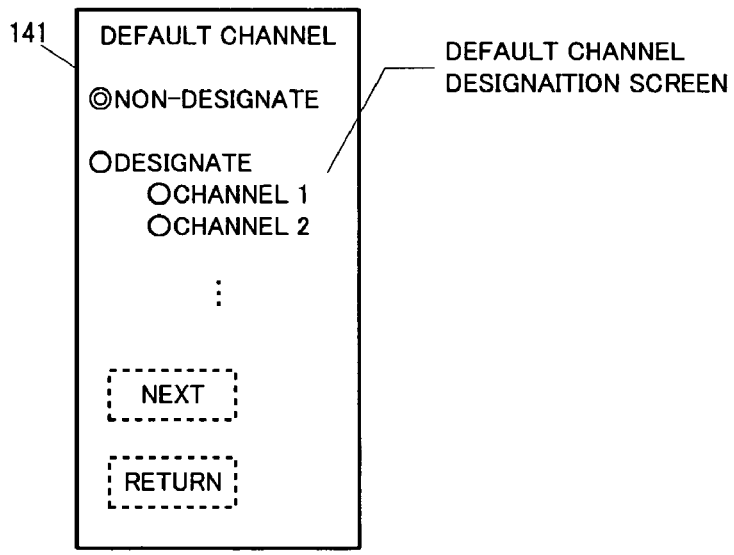
FIG. 6B is a view showing a display example of a "default channel designation screen"

When the "channel mode" is selected (step S1102: Yes), the setting section 112 displays a "default channel designation screen" as shown in FIG. 6B on the display section 141 (step S1103). The "default channel designation screen" is a screen for selecting whether the default channel should be designated and for selecting a channel when the default channel is designated. The default channel here is a channel for starting reception when the television reception function of the mobile communication terminal 10 is started. The user operates the operation section 131 to perform selection whether the default channel should be designated and selection for a channel as a default channel.

When the default channel is designated (step S1104: Yes), the setting section 112 creates setting information, which brings information, indicating the selected setting mode (namely, channel mode) and a channel selected as a default channel, into correspondence with information indicating that the relevant channel is the default channel (step S1108), and stores the created setting information in the storage section 180 (step S1109), and ends processing.

Figure 6C:
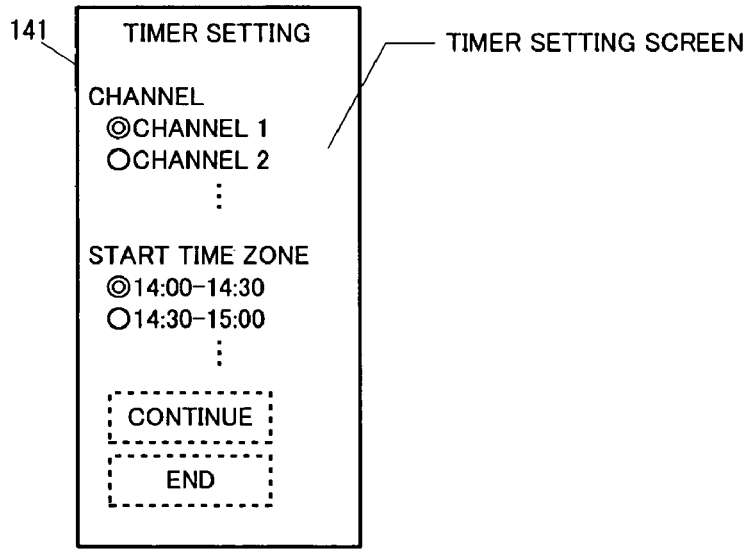
FIG. 6C is a view showing a display example of a "timer setting screen"

On the other hand, when the default channel is not designated (step S1104: No), the setting section 112 displays a "timer setting screen" as illustrated in FIG. 6C on the display section 141 (step S1105). As illustrated in the figure, on the "timer setting screen", a desired channel to be viewed and a reception start time zone of the relevant channel are selectably displayed.

The user operates the operation section 131 to select the desired channel to be viewed and the reception start time zone of the relevant channel. With this operation, information, which indicates the user designated channel and the reception start time zone of the relevant channel, are input to the control section 110 (step S1106).

Also, as illustrated in FIG. 6C, on the "timer setting screen", a button for selecting continuation of the timer setting or a button for selecting completion of thereof are displayed. In this embodiment, it is assumed that a plurality of timer settings is possible, and when the user desires the plurality of timer settings, the user operates the control section 131 to select the button for designating "continuation."

When "continuation" is selected (step SI 107: No), processing goes back to step S1105 and timer setting is further performed.

When "completion" is selected (step S1107: Yes), the setting section 112 creates setting information, which brings information, indicating the selected setting mode (namely, channel mode), into correspondence with information indicating the timer-set channel and the reception start time zone (step S1108), and stores the created setting information in the storage section 180 (step S1109), and ends processing.

On the other hand, when the "program guide mode" is selected as the setting mode (step S1102: No), the setting section 112 creates setting information, which indicates that the selected setting mode is the program guide mode, (step S1108), and stores the created setting information in the storage section 180 (step S1109), and ends processing.

By the execution of setting processing as mentioned, the operation relating to the television reception by the mobile communication terminal 10 is set and setting information, which indicates the contents of setting, is stored in the storage section 180.

Figure 7:
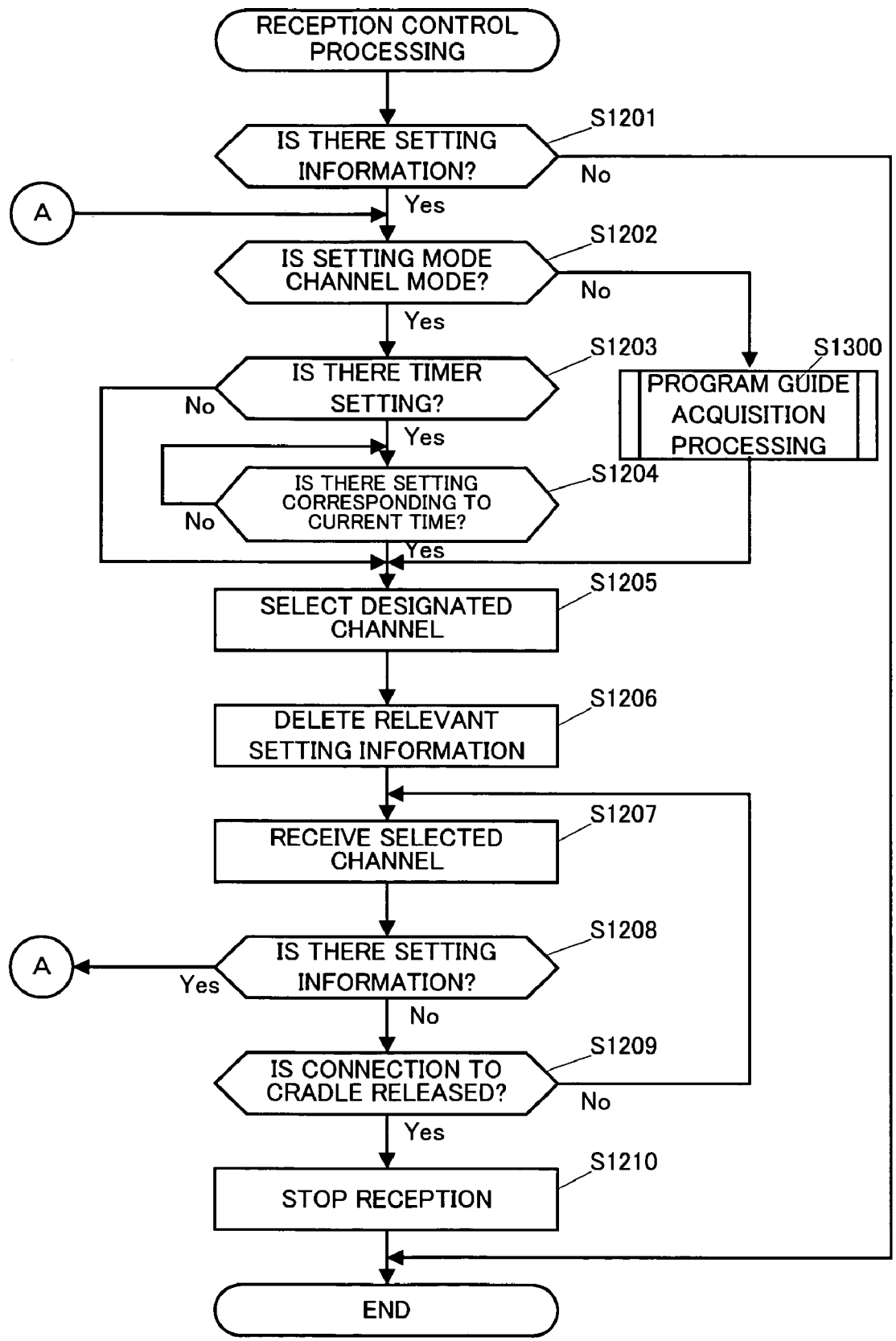
FIG. 7 is a flow chart explaining "reception control processing" according to the first embodiment of the present invention.

An explanation will be next given of one example of the operation when the mobile communication terminal 10 is mounted on the cradle 11. The following will explain "reception control processing", that is executed by the control section 110 of the mobile communication terminal 10 in mounting the mobile communication terminal 10 on the cradle 11, with reference to the flow chart shown in FIG. 7. This "reception control processing" is started at the time when the mobile communication terminal 10 is mounted on the cradle 11. In other words, this "reception control processing" is started at the time when the connection detection section 111 detects connection between the connector section 160 of the mobile communication terminal 10 and the feeding connector of the cradle 11.

In this case, when power feeding from the cradle 11 is started by the connection between the connectors and power is supplied to the connector section 160 from the power supply section 170, the power supply section 170 notifies the control section 110 of the power supply. The connection detection section 111 detects that the mobile communication terminal 10 is connected to the cradle 11 based on a notification from the power supply section 170. It should be noted that the mobile communication terminal 10 is connected to the cradle 11 while being powered on.

When processing is started after detection of the connection to the cradle 11, the reception control section 113 gains access to the storage section 180 to determine whether setting information relating to the reception setting is stored therein (step S1201).

When the setting information of the reception setting is not stored in the storage section 180 (step S1201: No), processing is directly ended.

On the other hand, when the setting information is stored in the storage section 180 (step S1201: Yes), the reception control section 113 determines whether the setting mode set in the relevant setting information is the channel mode (step S1202).

When the setting mode is not the channel mode, namely, the setting mode is the program guide mode (step S1202: No), the reception control section 113 executes "program guide acquisition processing" for acquiring electronic program guide data (step S1300). The details on the program guide acquisition processing will be described later.

On the other hand, when the setting mode is the channel mode (step S1202: Yes), the reception control section 113 determines whether the reception start time zone is designated in the reception setting included in the relevant setting information (whether timer is set) (step S1203).

When the reception start time zone is designated (step S1203: Yes), the reception control section 113 determines whether there is a reception setting in which the reception start time zone, which corresponds to the current time acquired by the timer operation, is designated (step S1204).

When the reception start time zone, which corresponds to the current time, is designated (step S1204: Yes), the reception control section 113 causes the tuner section 150 to execute to select a channel designated by the relevant reception setting (step S1205).

In this case, the reception control section 113 gains access to the storage section 180 to delete the setting information relating to the relevant reception setting (step S1206).

Then, the reception control section 113 causes the television reception section 123 to receive an airwave of the channel selected by the tuner section 150 (step S1207).

Additionally, when the set reception start time zone does not correspond to the current time (step S1204: No), the reception control section 113 waits until the current time reaches the relevant time zone. Then, at the time when the current time reaches the designated reception start time, the reception control section 113 causes the channel selection and reception to be started (steps S1205, S1207).

Moreover, when the default channel is set in the setting information (step S1203: No), the reception control section 113 causes the tuner section 150 to select the relevant channel (step S1205). Then, after deleting the setting information (step S1206), the reception control section 113 causes the television reception section 123 to execute the reception of the airwave of the channel selected by the tuner section 150 (step 1207).

Namely, in the case where the default channel is set, the reception of the set channel is started at the time when the mobile communication terminal 10 is mounted on the cradle 11.

When the tuner section 150 selects the channel based on the setting information, the relevant setting information is deleted in step S1206. However, for example, when two or more timer settings are provided, setting information relating to the other timer settings remains in the storage section 180 (step S1208: Yes). In this case, processing goes back to step S1202 to execute the operation based on the remaining setting information. Namely, in the case where the plurality of timer settings is provided, processing in steps S1204 to S1206 is performed in connection with the reception setting where a next reception start time zone is designated, so that the reception of the set channel is executed at the time when the current time reaches a next reception start time zone. As a result, in the case of a plurality of reception settings where the reception start time zone is designated, when the current time reaches a reception start time zone designated to each reception setting, the channel is sequentially changed to a designated channel.

On the other hand, when there is no setting information other than the reception setting relating to the operation being currently executed (step S1208: No), the reception operation in execution is stopped (step S1210) at the time when the mobile communication terminal 10 is detached from the cradle 11 during the reception operation (step S1209: Yes), and then processing is ended. In this case, the power supply section 170 notifies the control section 110 of the stop of power feeding caused by detachment of the mobile communication terminal 10 from the cradle 11. The connection detection section 111 detects release of the connection between the mobile communication terminal 10 and the cradle 11 based on this notification, and the reception control section 113 stops the reception operation of the television reception section 12.

In addition, when there is no release of the connection to the cradle 11 (step S1209: No), the reception operation being currently executed is continued (step S1207).

Figure 8:
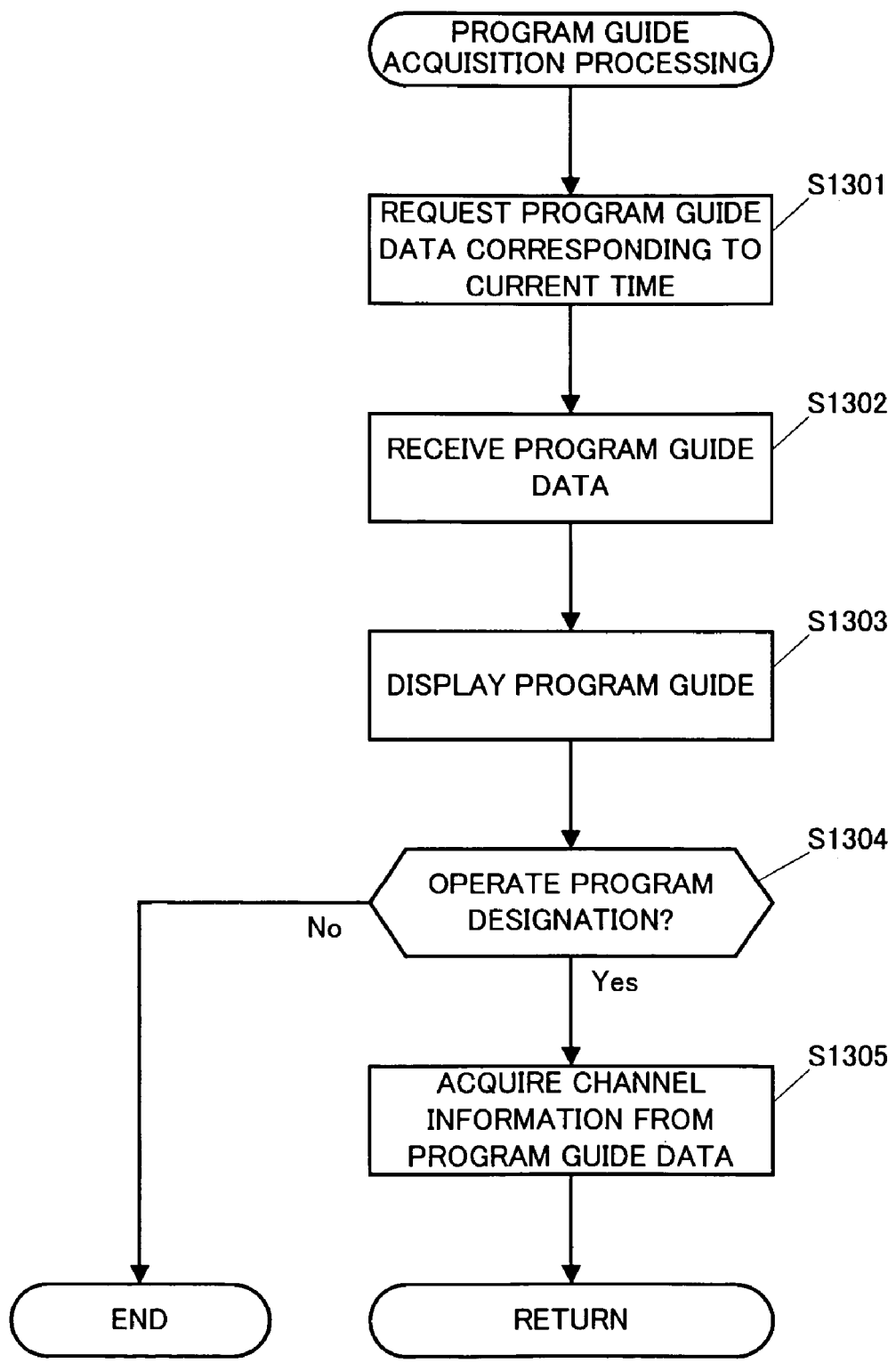
FIG. 8 is a flow chart explaining "program guide acquisition processing" executed by the reception control processing illustrated in FIG. 7.

The following will explain "program guide acquisition processing", which is executed when the setting mode is the program guide mode, with reference to a flow chart shown in FIG. 8.

When processing is started, the reception control section 113 controls the data communication section 122 to gain access to a site (hereinafter referred to as "program guide providing side), which provides program guide data via the Internet, and requests provision of program guide data corresponding to the current time (step S1301). Additionally, it is assumed that address information for designating a program guide providing site (for example, URL (Uniform Resource Locator)) is prestored in the storage 180, and the data communication section 122 gains access to the program providing site.

The program guide providing site transmits program guide data corresponding to the current time to the mobile communication terminal 10 in response to the request for provision from the mobile communication terminal 10.

In the mobile communication terminal 10, the data communication section 122 receives program guide data sent from the program guide providing site (step S1302) and inputs the received data to the control section 110.

Figure 9:
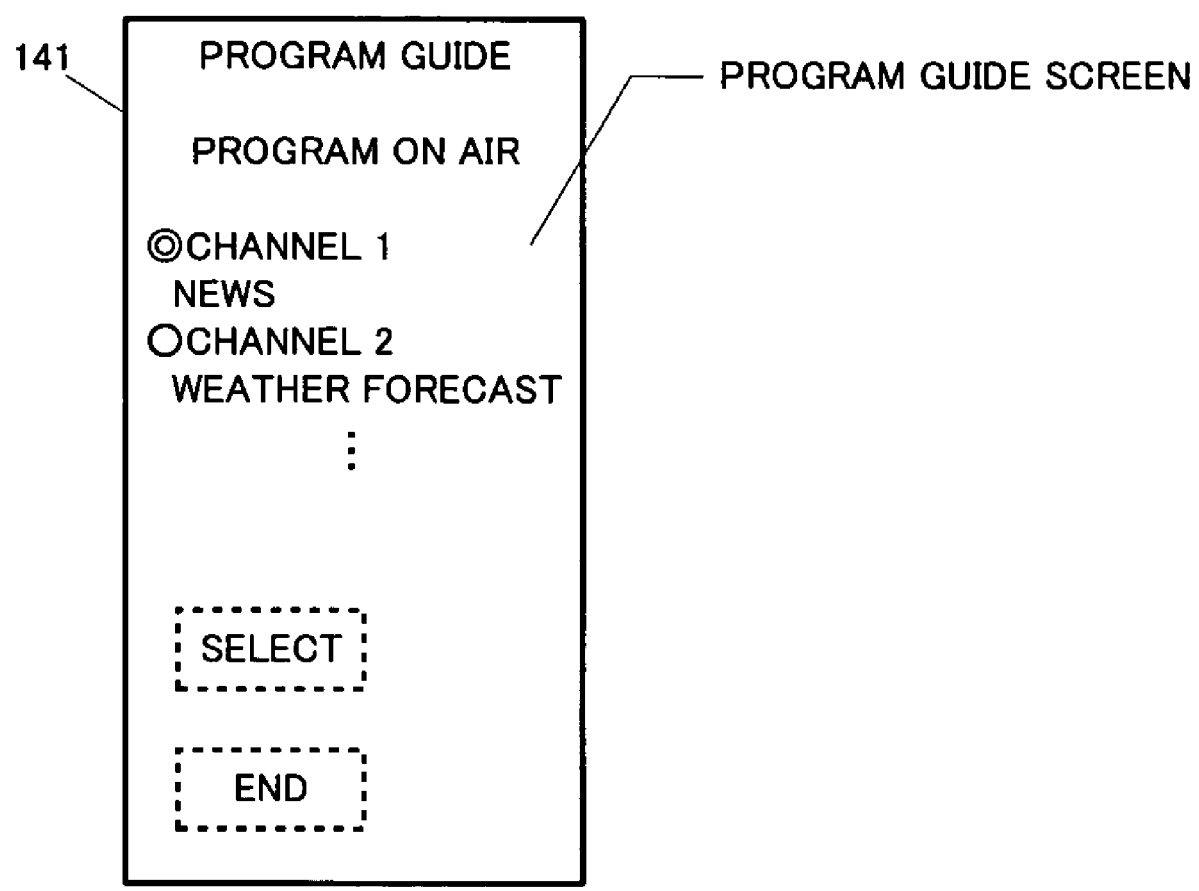
FIG. 9 is a view showing a display example of a "program guide screen"

When acquiring program guide data in this way, the reception control section 113 generates a program guide screen (FIG. 9), including a program guide based on the acquired program guide data, in cooperation with the display section 141 and displays the generated screen on the display section 141 (step S1303). Since the program guide data corresponding to the current time is acquired, the program guide, which shows a television program being broadcasted at the current time that is the time when the mobile communication terminal 10 is mounted on the cradle 11, is displayed on the display section 141. This program guide is described in, for example, a predetermined markup language, and is displayed in such a way that an arbitrary program can be selected by a user operation of the operation section 131.

Moreover, on the program guide screen, there is a button ("end" button) for designating that no program is selected. When there is no program to be desirably viewed, the user operates the operation section 131 to select the "end" button.

When the "end" button is selected (step S1304: No), processing is directly ended. In other words, the television reception operation is not performed.

On the other hand, when the user operates the operation section 131 and selects any of programs in the program guide (step S1304: Yes), the reception control section 113 acquires channel information, which indicates a channel that broadcasts a selected program, from program guide data (step S1305), and processing goes back to step S1205 of "reception control processing" shown in FIG. 7. Namely, the tuner section 150 selects the channel, which broadcasts the program selected from program guide, (step S1205) and the television reception section 123 receives an airwave of the relevant channel (step S1207).

With the aforementioned operation, the television reception operation, which is based on the setting information, is automatically executed at the time when the mobile communication terminal 10 is connected to the cradle 11.

In addition, power of the mobile communication terminal 10 may be controlled at the time when the mobile communication terminal 10 is connected to the cradle 11. The following will explain an operation example of the mobile communication terminal 10 in this case.

In this case, the control section 110 of the mobile communication terminal 10 executes "power control processing" at the time when the mobile communication terminal 10 is connected to the cradle 11. In this example, it is assumed that the mobile communication terminal 10 is connected to the cradle 11 while being powered off.

Figure 10:
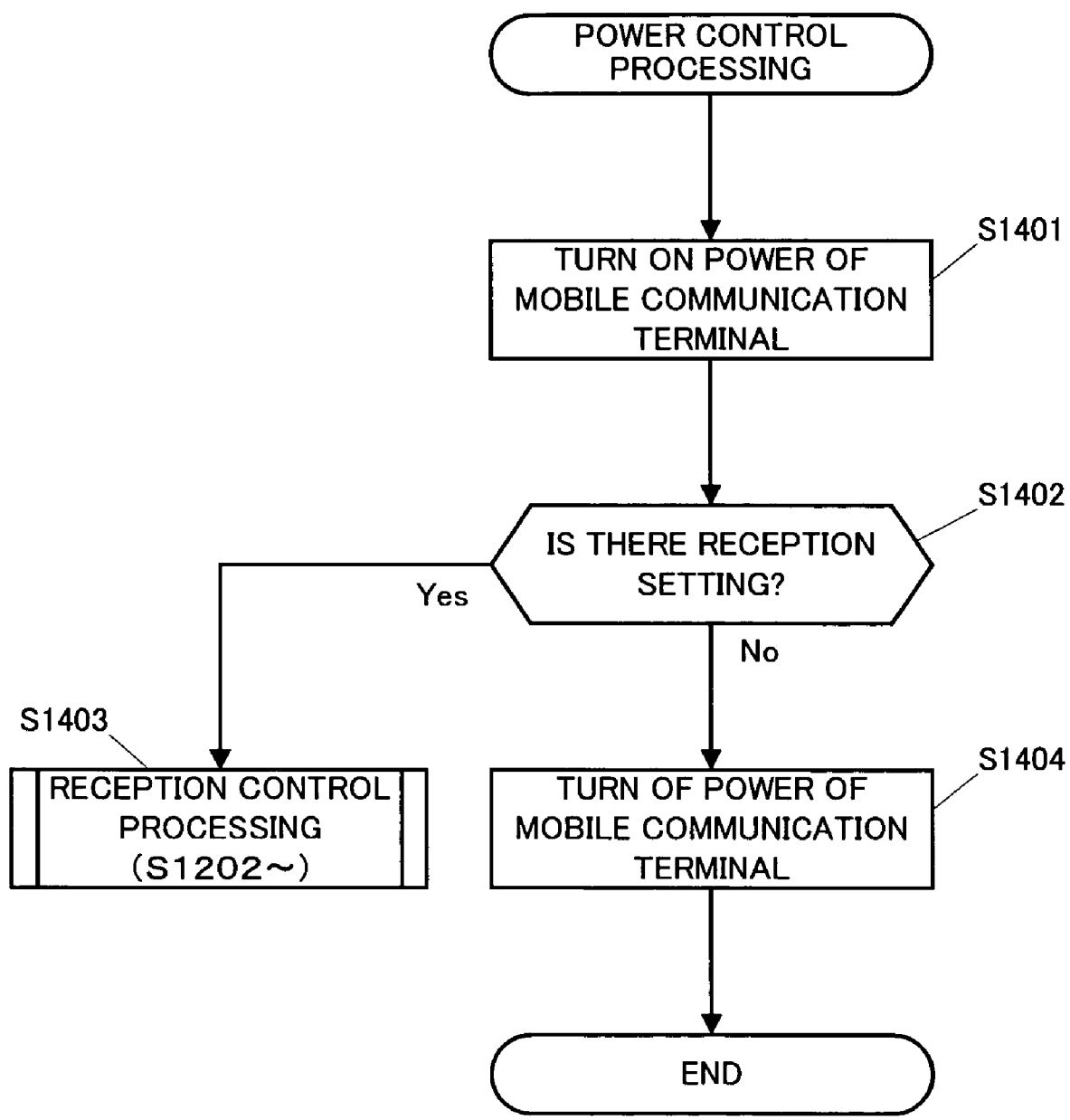
FIG. 10 is a flow chart explaining "power control processing" according to the first embodiment of the present invention.

This "power control processing" will be explained with reference to a flow chart shown in FIG. 10. It should be noted that "power control processing" is started at the time when connection detection is performed by the connection detection section 111, similar to the aforementioned "reception control processing."

When processing is started, the power control section 114 instructs the power supply section 170 to turn on the mobile communication terminal 10. The power supply section 170 turns on the mobile communication terminal 10 in accordance with the instruction from the power control section 114 (step S1401). In this case, the power supply section 170 supplies power fed from the cradle 11 to each section of the mobile communication terminal 10, thereby turning on the mobile communication terminal 10.

When the mobile communication terminal 10 is turned on, the reception control section 113 gains access to the storage section 180 and determines whether there is setting information relating to the television reception function (step S1402).

When there is setting information (step S1402: Yes), the reception control section 113 executes processing in after step S1202 relating to the aforementioned "reception control processing (FIG. 7) (step S1403). In other words, when the mobile communication terminal 10 is turned on by being connected to the cradle 11 and there is setting information, the reception operation, which is based on the relevant setting information, is executed.

When there is no setting information (step S1402: No), the power control section 114 instructs the power supply section 170 to turn off the mobile communication terminal 10. When the power supply section 170 turns off the mobile communication terminal 10 in accordance with the instruction from the power control section 114 (step SI 404), and processing is ended. In this case, battery charging is performed by power feeding from the cradle 11.

With this operation, when the mobile communication terminal 10 is connected to the cradle 11 while being powered off, the mobile communication terminal 10 is automatically turned on. Then, if there is setting information relating to the television reception operation, the reception operation, which is based on the relevant setting information, is automatically executed. On the other hand, when there is no setting information, the mobile communication terminal 10 is automatically turned off.

As explained above, according to the mobile communication terminal 10 of the first embodiment, when the mobile communication terminal 10 is connected to the cradle 11, the reception operation, which is based on the preset reception setting, is automatically executed. This allows the user desirable channel and program to be automatically received when the mobile communication terminal 10 is used as a television receiver at home, thereby making it possible to increase user convenience.

Second Embodiment

Figure 11:
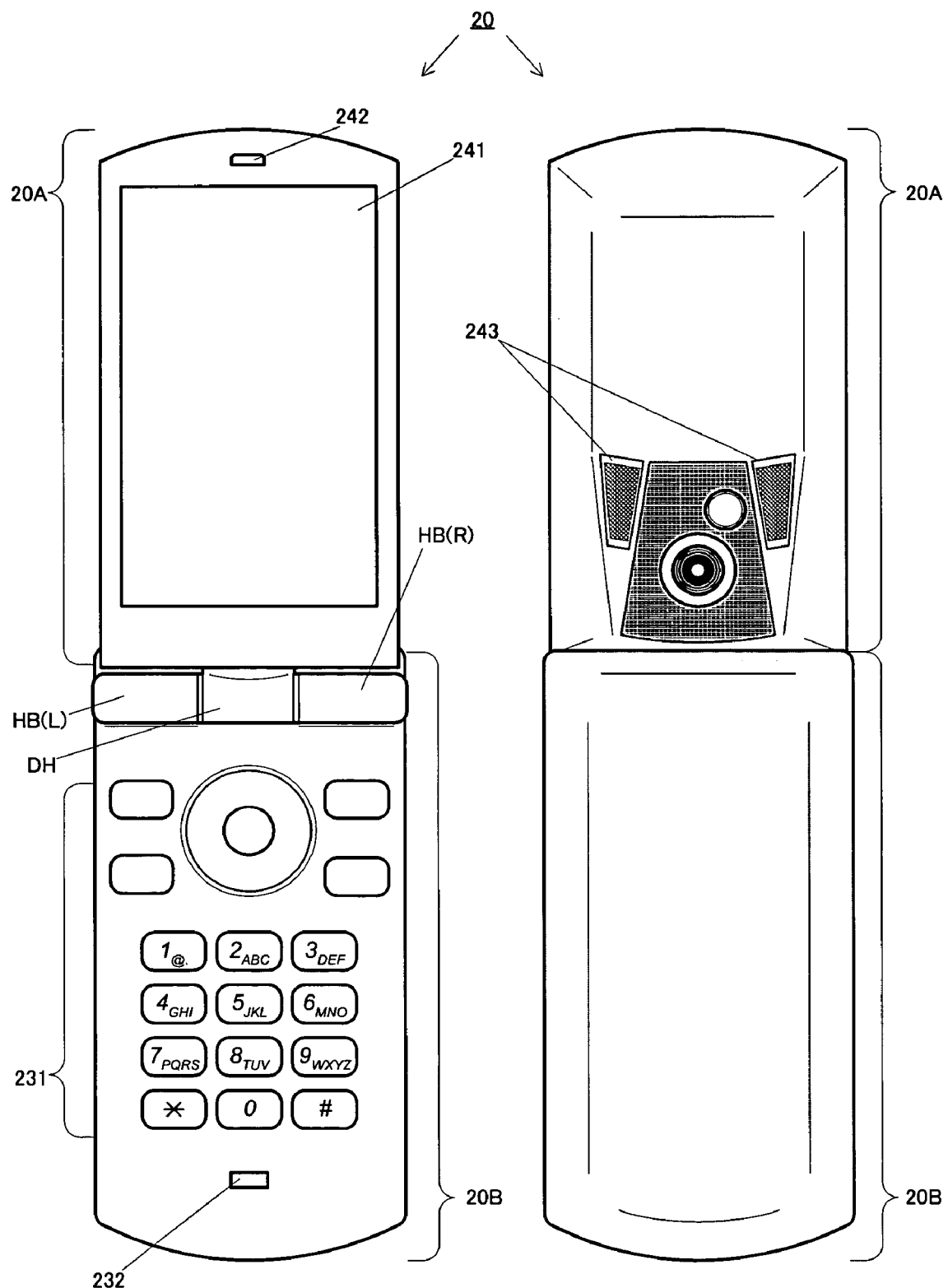
FIG. 11A is a view showing an external configuration of a main surface side of the mobile communication terminal (time when the mobile communication terminal is formed in open style) according to a second embodiment of the present invention.
FIG. 11B is a view showing an external configuration of an outer surface side of the mobile communication terminal (time when the mobile communication terminal is formed in open style) according to the second embodiment of the present invention.

The following will explain a second embodiment using an example in which the present invention is applied to the mobile communication terminal having housings holdable in multiple styles. A mobile communication terminal 20 according to the second embodiment will be explained with reference to FIG. 11. FIG. 11 is a view showing an external configuration of the mobile communication terminal 20.

As shown in the figure, the mobile communication terminal 20 according to this embodiment is configured to be foldable by two movable housing sections (housings 20A and 20B), which are connected by a dual hinge DH. FIG. 11 shows a state in which the mobile communication terminal 20 is developed and also shows a style (form) that is used to employ the voice call function of the mobile communication terminal 20. More specifically, as shown in FIG. 11A, this is the style in which the mobile communication terminal 20 is developed in such a way that a speaker 242 for a receiver and a microphone 232 for a transmitter, both which are used at the speech communication, are flushed with each other. This style is hereinafter referred to as "open style." Moreover, in this embodiment, it is assumed that a surface shown in FIG. 11A is a main surface of the mobile communication terminal 20. In addition, FIG. 11B shows an external configuration of an outer surface side of the mobile communication terminal 20 at the time when the mobile communication terminal 20 is formed in open style.

In this embodiment, as shown in FIG. 11A, it is assumed that the speaker 242 for a receiver and a display screen (display section 241) are formed on the main surface of the housing 20A and that an operation section 232 including keys and buttons and the microphone 232 for a transmitter are formed on the main surface of the housing 20B. Moreover, as illustrated in FIG. 11B, a main speaker 243 is formed on an outer surface of the housing 20A. Accordingly, in using the mobile communication terminal 20 in open style, the display section 241 is directed toward the user side (front side).

Figure 12:
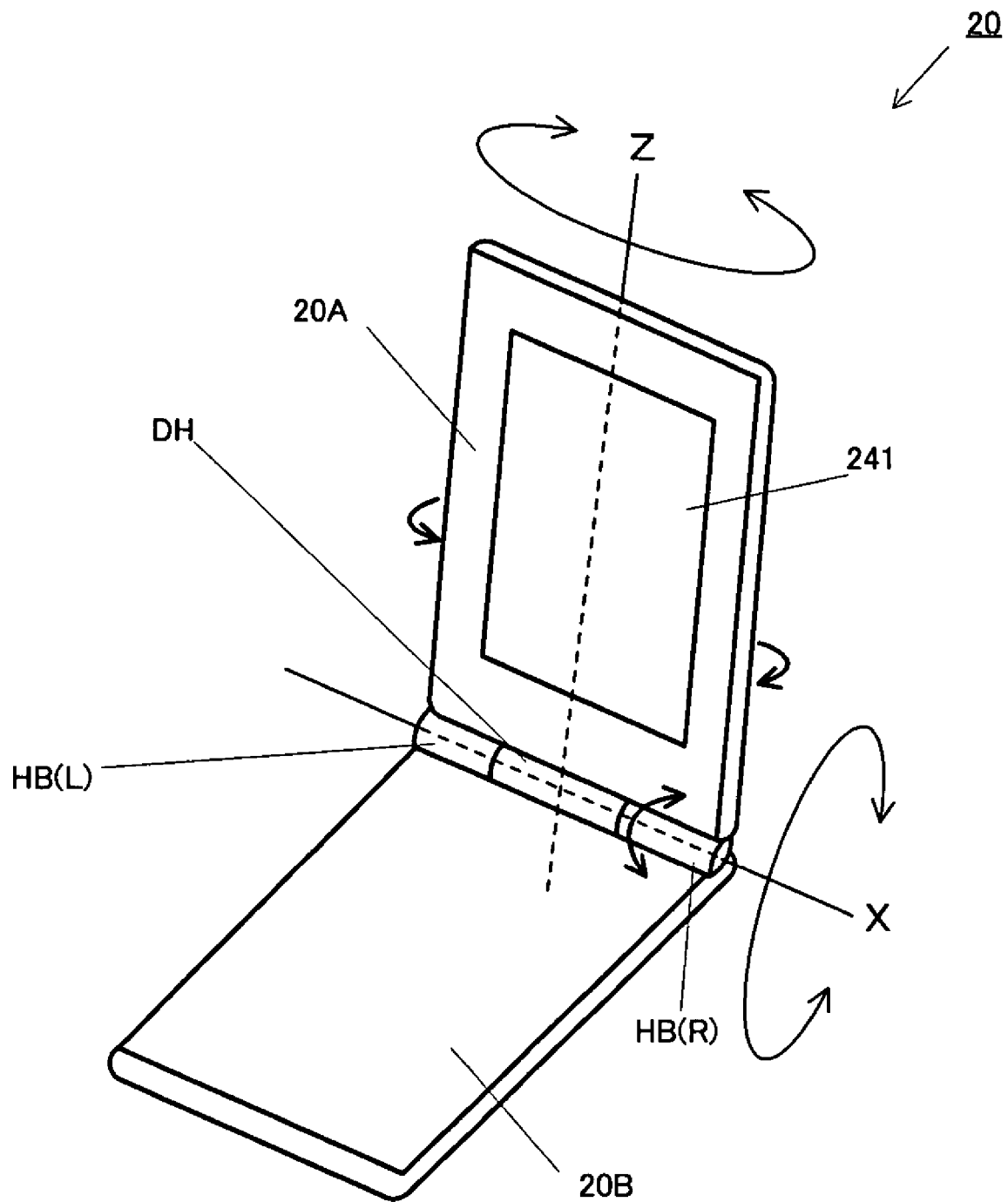
FIG. 12 is a view explaining an operation of a housing of the mobile communication terminal illustrated in FIG. 11.

Here, in the mobile communication terminal 20, the housing 20A is connected to the housing 20B to be rotatable in two directions by the dual hinge DH, thereby allowing the mobile communication terminal 20 to be held in multiple kinds of styles (forms). More specifically, the dual hinge DH connected to the housing 20A is rotatably held by hinge bases (right hinge base HB (R) and left hinge base HB (L)) fixed to the housing 20B, thereby the housing 20A is rotatably held within a predetermined range in a rotational direction about X axis as shown in FIG. 12. The housing 20A is rotated about the X axis, thereby making it possible to the whole mobile communication terminal 20 to be opened and closed (developed ←→ folded).

Additionally, both the dual hinge DH and the housing 20A are rotatably connected to each other. That is, the dual hinge HD has a movable portion where the housing 20A can be horizontally rotated about Z axis as a central axis as shown in FIG. 12. As a result, the housing 20A is rotatably connected to the housing 20B within a predetermined range in a rotational direction about the Z axis as shown in FIG. 12 (for example, right and left 180°).

Figure 13A:
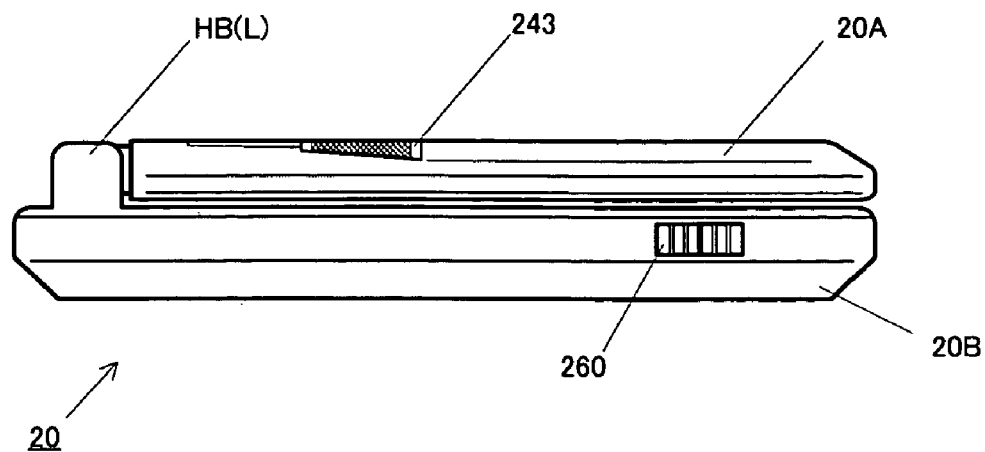
FIG. 13A is a side view showing an example in which the mobile communication terminal is formed in close style.
Figure 13B:
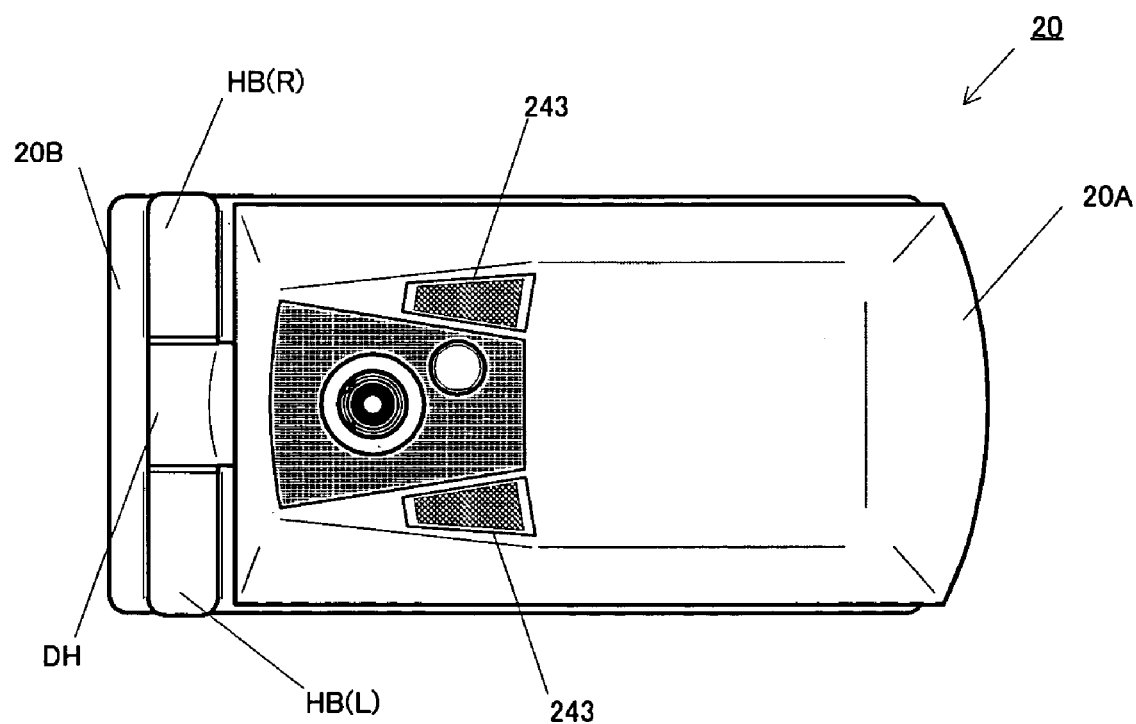
FIG. 13B is a plane view showing an example in which the mobile communication terminal is formed in close style.

The following will explain the examples of styles of the mobile communication terminal 20 that are allowed by the dual hinge HD. First, FIG. 13 shows a style in which the housing 20A is rotated about the X axis from the open style shown FIG. 11 in such a way that the main surface of the housing 20A and the main surface of the housing 20B are opposed to each other. This style shows the general folded state, and is hereinafter referred to as "close style." In FIG. 13, FIG. 13A is a side view of the mobile communication terminal 20 and FIG. 13B is a plane view of the mobile communication terminal 20.

Next, FIG. 14 shows a style in which the housing 20A is rotated by 180 degrees about the Z axis from the open style shown FIG. 11. In this case, this style shows the state in which the housing 20A is inversed and is hereinafter referred to as "reverse-open style." In FIG. 14, FIG. 14A is a plane view of the mobile communication terminal 20 and FIG. 14B is a side view of the mobile communication terminal 20. When the user holds the mobile communication terminal 20 in reverse-open style, the main speaker 243 formed on the outer surface of the housing 20A is directed toward the user side (front side).

Figure 15A:
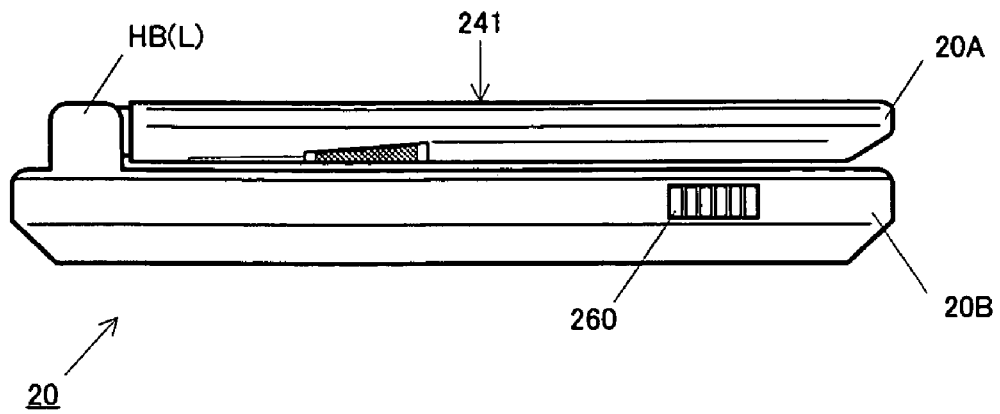
FIG. 15A is a side view showing an example in which the mobile communication terminal is formed in view style.
Figure 15B:
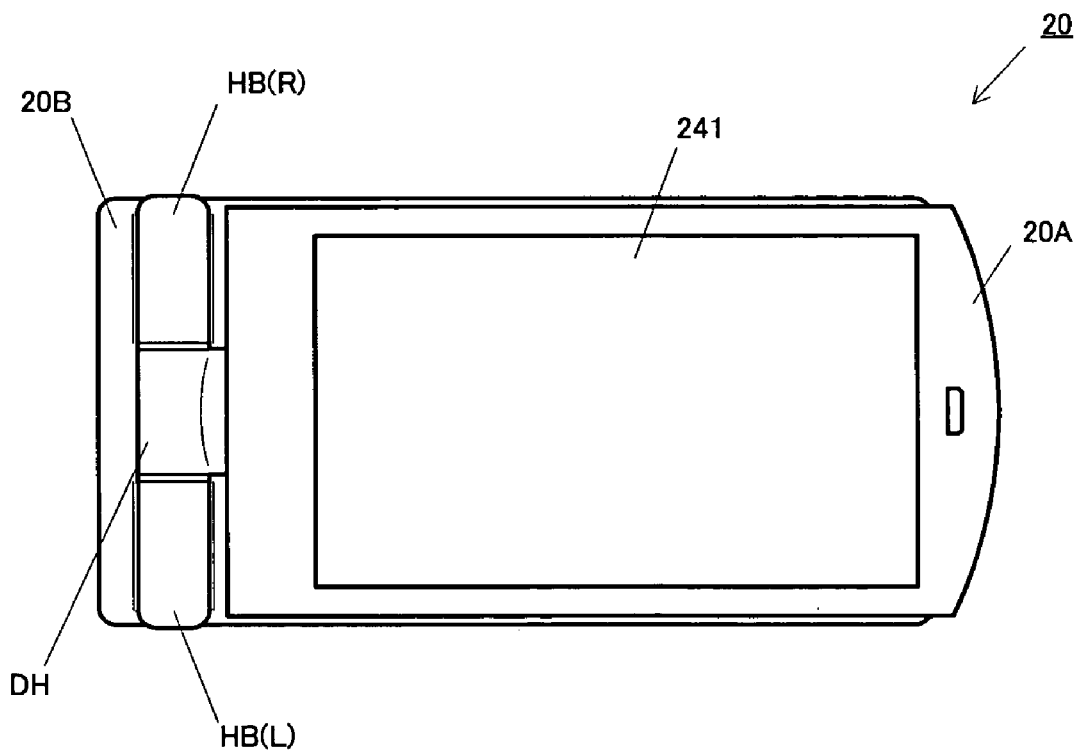
FIG. 15B is a plane view showing an example in which the mobile communication terminal is formed in view style.

Moreover, FIG. 15 shows a style in which the housing 20A is rotated about the X axis from the reverse-open style shown FIG. 14 in such a way that the outer surface of the housing 20A and the main surface of the housing 20B are opposed to each other. This style shows the state in which the housing 20A in close style shown in FIG. 13 is reversed and the display section 241 is exposed. This style is one that is used to view a picture image and a moving image displayed on the display section 241 and is hereinafter referred to as "view style." In FIG. 15, FIG. 15A is a side view of the mobile communication terminal 20 and FIG. 15B is a plane view of the mobile communication terminal 20. This view style is set as an appropriate style for the user to view the display on the display section 241. Accordingly, in using the mobile communication terminal 20 in view style, the display section 241 is directed toward the user side (front side).

As mentioned above, the mobile communication terminal 20 according to this embodiment can offer the aforementioned four styles (forms) by changing the position and the direction of the movable housings connected by the dual hinge HD. In this case, the display screen (display section 241) of the mobile communication terminal 20 is exposed in the open style and view style, and the speech output device (main speaker 243) of the mobile communication terminal 20 is exposed in the reverse-open style and close style.

Furthermore, it is assumed that a predetermined charging base (cradle, stand) is used in charging a battery as an operation power source for the mobile communication terminal 20 to be portably used or in driving the mobile communication terminal 20 with commercial power supply. In this embodiment, the mobile communication terminal 20 is mounted on a cradle 21 as shown in FIG. 16 to perform charging.

Figure 16:
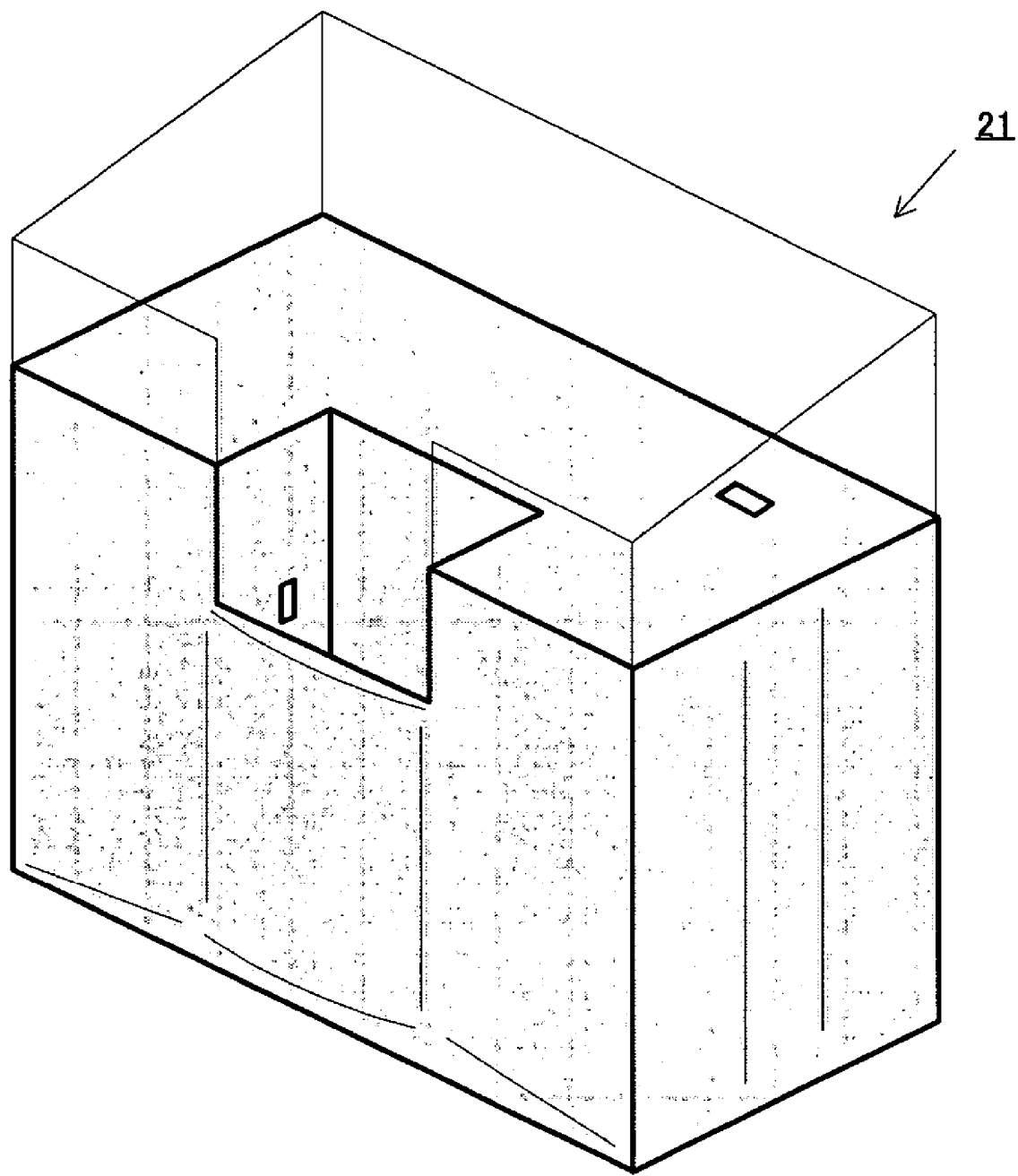
FIG. 16 is a side view showing an outer appearance of a cradle according to the second embodiment.
Figure 17:
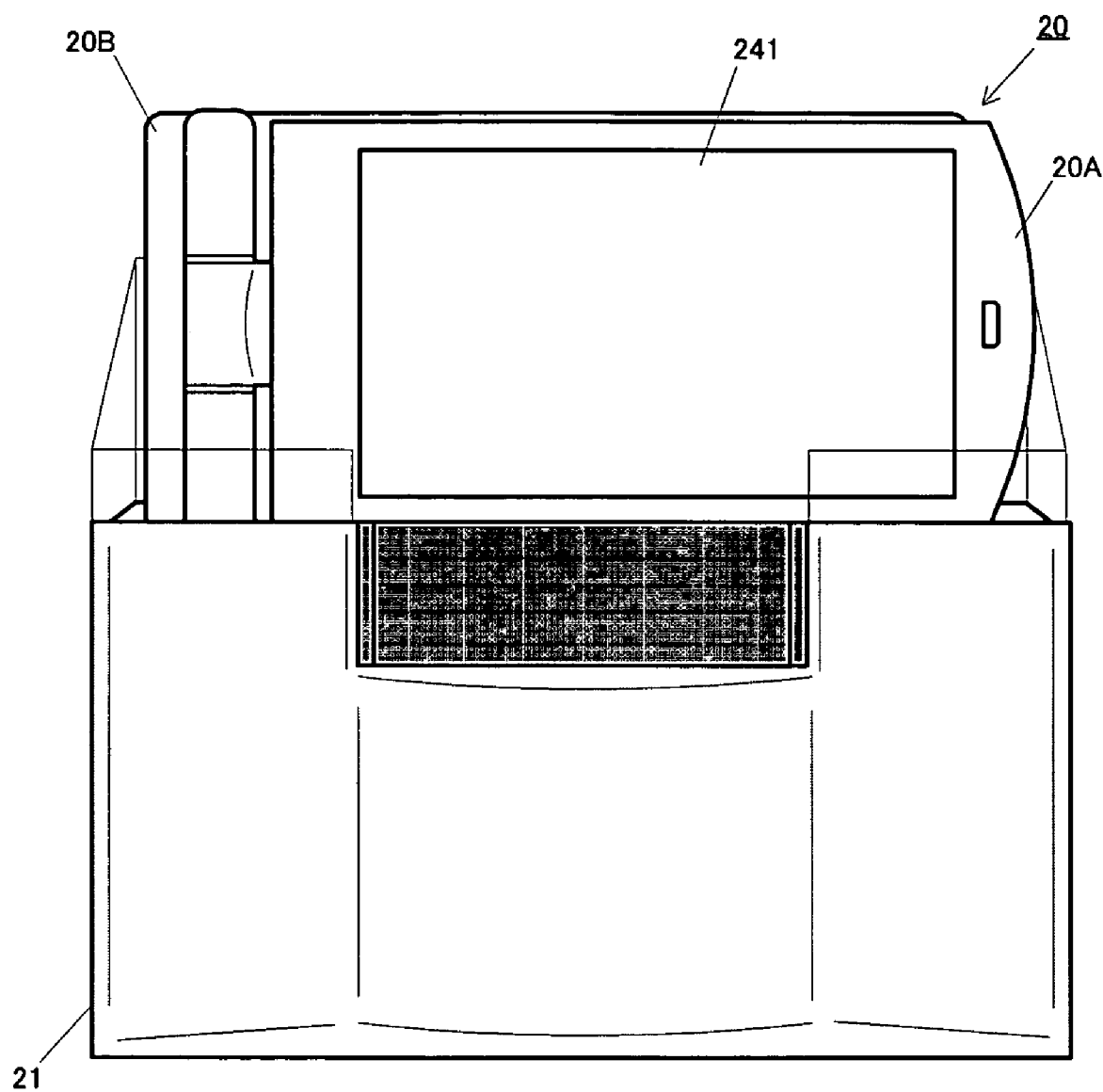
FIG. 17 is a side view explaining a state in which the cradle shown in FIG. 16 and the mobile communication terminal are connected to each other.
Figure 18:
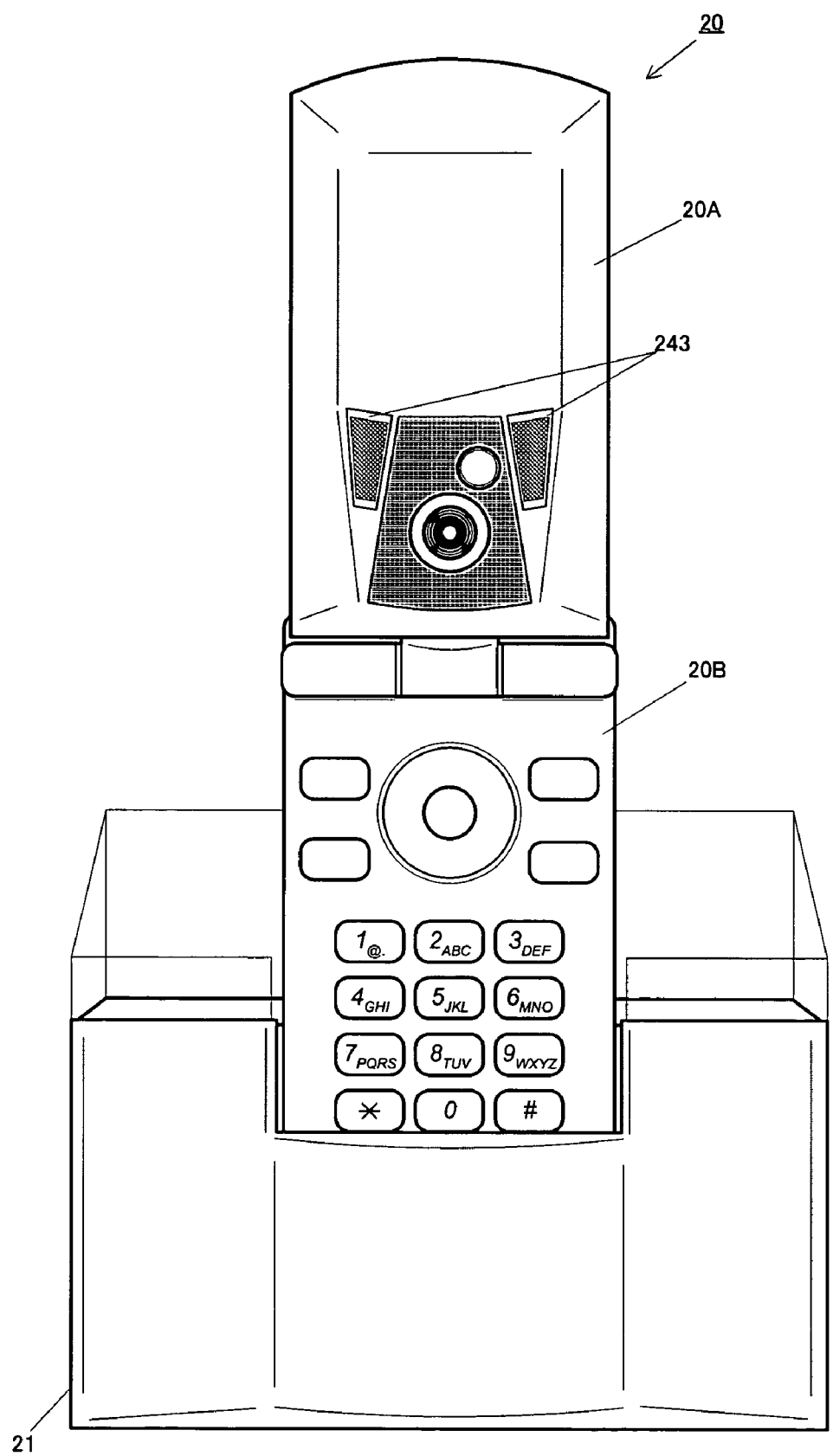
FIG. 18 is a side view explaining a state in which the cradle shown in FIG. 16 and the mobile communication terminal are connected to each other.

The cradle 21 shown in FIG. 16 is shaped to allow the mobile communication terminal 20 to be held even when the mobile communication terminal 20 is formed in any style. In other words, when the mobile communication terminal 20 is formed in close style or view style (namely, folded state), the mobile communication terminal 20 is mounted on an upper surface of the cradle 21, thereby the terminal 20 is held as shown in FIG. 17 (FIG. 17 illustrates an example of the view style). In addition, when the mobile communication terminal 20 is formed in open style or reverse-open style (namely, developed state), a portion of the housing 20B of the mobile communication terminal 20 is inserted into a notched portion (FIG. 16) formed on the front surface of the housing of the cradle 21, thereby the terminal 20 is held as shown in FIG. 18 (FIG. 18 illustrates an example of the reverse-open style).

Connectors for power feeding are formed on both the upper surface of the cradle 21 and the notched portion thereof to make it possible to feed power to the mobile communication terminal 20 even if the mobile communication terminal 20 is formed in any style. These connectors are placed at a position where they are engaged with a connector portion 260 of the mounted mobile communication terminal 20. In this embodiment, supposing that when the connector portion 260 of the mobile communication terminal 20 is connected to the cradle 21 in such a way to be engaged with the feeding connectors of the cradle 21, the surface of the mobile communication terminal 20, which corresponds to the front surface side of the cradle 21 (namely, the side opposing to the operating user), is a front surface. For example, when the mobile communication terminal 20 is connected to the cradle 21 in view style as shown in FIG. 17, the main surface of the housing 20A with the display section 241 is the front surface. When the mobile communication terminal 20 is connected to the cradle 21 in reverse-open style as shown in FIG. 18, the outer surface of the housing 20A with the main speaker 243 is the front surface.

The above-mentioned cradle 21 includes an outlet and a cord for commercial power to acquire commercial power. When connection between these connectors is established by mounting the mobile communication terminal 20 on the cradle 21, acquired commercial power is sequentially supplied to the mobile communication terminal 20.

Figures 19A, 19B:
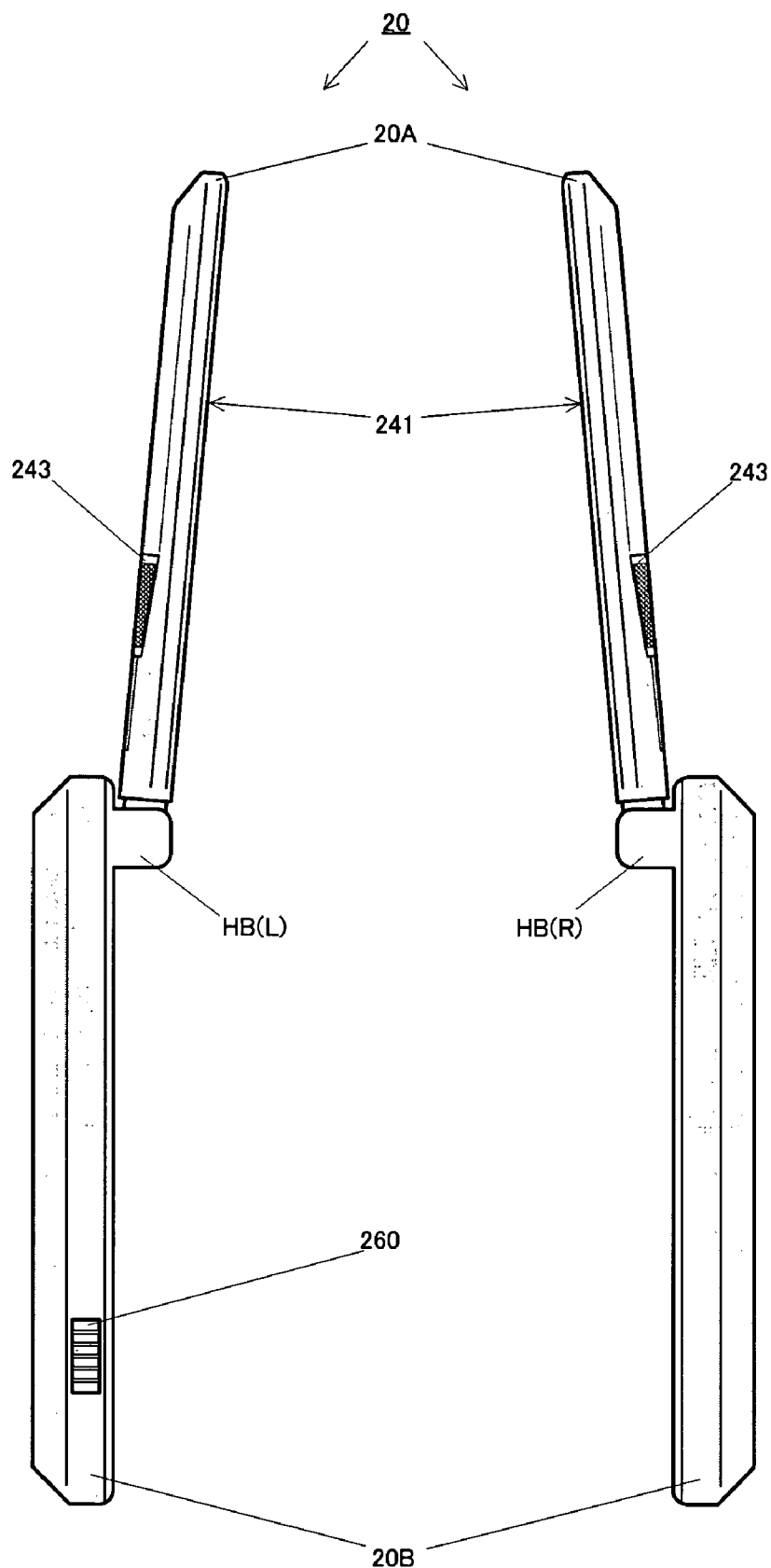
FIG. 19A is a side view showing a left side surface of the mobile communication terminal shown in FIG. 11.
FIG. 19B is a side view showing a right side surface of the mobile communication terminal shown in FIG. 11.

In this embodiment, it is assumed that the connector portion 260 is formed on the side surface portion on the left facing the main surface of the housing 20B as shown in FIG. 19. FIG. 19 is a view showing both side surfaces of the mobile communication terminal 20 in open style, and FIG. 19A is a side view showing a side surface on the left facing the main surface, and FIG. 19B is a side view showing a side surface on the right facing the main surface.

Figure 20:
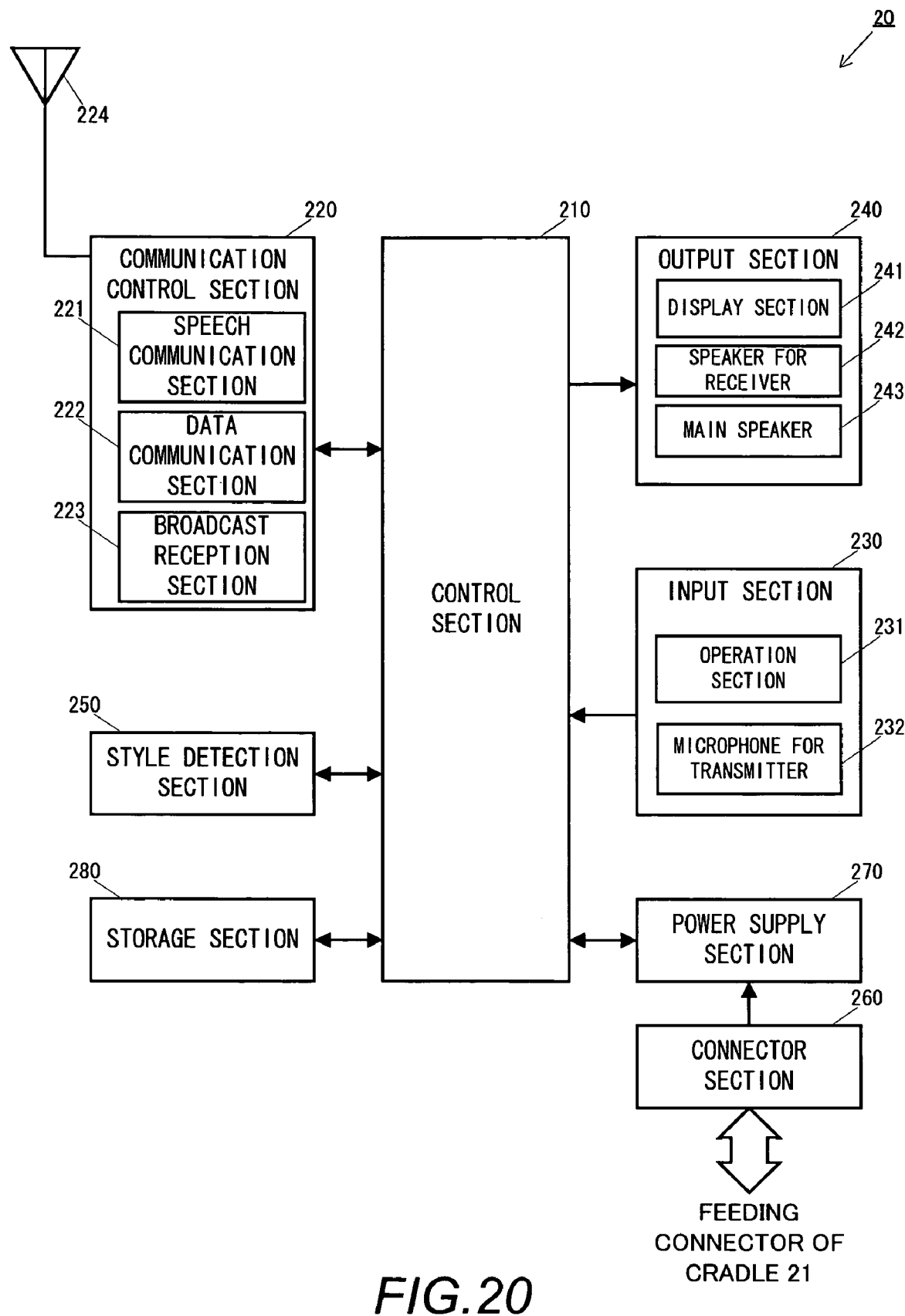
FIG. 20 is a block diagram showing the configuration of the mobile communication terminal according to the second embodiment of the present invention.

The respective components of the aforementioned mobile communication terminal 20 will be explained with reference to FIG. 20 (FIG. 11). FIG. 20 is a block diagram showing the configuration of the mobile communication terminal 20.

As shown in the figure, the mobile communication terminal 20 includes a control section 210, a communication control section 220, an input section 230, an output section 240, a style detection section 250, a connector section 260, a power supply section 270, a storage section 280, and the like.

The control section 210 includes, for example, a CPU and a predetermined storage device (RAM) as a work area, and controls the respective sections of the mobile communication terminal 20 and executes each processing described later based on a predetermined operation program stored in the storage section 280. It should be noted that the below-described components of the mobile communication terminal 20 are connected to the control section 210, respectively, and data exchange among the respective components is assumed to be performed via the control section 210.

The communication control section 220 includes, for instance, a predetermined radio communication circuit and performs radio communication through a predetermined antenna section 224. The communication control section 220 further includes a speech communication section 221, a data communication section 222, a broadcast reception section 223, and the like.

The speech communication section 221 controls communication in connection with the telephone function (voice call function) of the mobile communication terminal 20. Here, for example, the speech communication section 221 controls the antenna section 224 to perform radio communication for a voice call via a telephone network such as a mobile communication network and to perform speech coding and decoding.

The data communication section 222 controls communication in connection with the data communication function of the mobile communication terminal 20. In this embodiment, for example, supposing that data communication is performed via IP network such as the Internet, and the data communication section 222 controls the antenna section 224 to perform radio connection to the data communication network and data transmission and reception.

It should be noted that the speech communication section 221 and data communication section 222 perform radio communication with a base station provided by a provider (so-called carrier) that offers mobile communication services to the mobile communication terminal 20.

The broadcast reception section 223 receives an airwave such as a television airwave and a radio airwave through the antenna section 224.

The antenna section 224 is an antenna device that includes, for example, a predetermined antenna circuit, an antenna line, etc, and is provided for at least both the mobile communication and the television airwave reception.

The input section 230 includes an operation section 231 and a microphone 232 for a transmitter, and functions as an interface for the user to input data to the mobile communication terminal 20.

The operation section 231 includes predetermined buttons and keys (for example, character keys (ten keys), function buttons, directional keys, etc) (FIG. 11) and causes an input signal to be input to the control section 210 according to a user operation.

The microphone 232 for a transmitter is a microphone that is formed on the main surface of the housing 20B, and inputs user speech at the speech communication.

The output section 240 includes a display section 241 and a speaker 242 for a receiver, a main speaker 243 and outputs various information.

The display section 241 includes, for example, a liquid crystal display device, which is formed on the main surface of the housing 20A (FIG. 11), and displays various screens relating to the functions of the mobile communication terminal 20. In this embodiment, the display section 141 displays various screens necessary for operating the mobile communication terminal 20, and displays and outputs an image reproduced by executing an application to be described later.

The speaker 242 for a receiver is a speaker, which is formed on the main surface of the housing 20A (FIG. 11), and outputs a received sound at the speech communication.

The main speaker 243 is a speaker, which is formed on the outer surface of the housing 20A (FIG. 11), and outputs sound reproduced by executing an application to be described later in addition to a ring alert and the like. In addition, the main speaker 243 according to this embodiment is a stereo speaker that is composed of a pair of speaker devices. In this case, stereo reproduction is achieved by the pair of right and left speaker devices in the arrangement of the main speakers 243 shown in FIG. 11. Accordingly, for reproducing the sound by the main speaker 243, the main speakers 243 are placed in the right and left directions as shown in FIG. 11, so that sound reproduction performance can be fully offered.

The style detection section 250 includes, for example, a predetermined sensor device, and detects in which style the mobile communication terminal 20 is formed. More specifically, the style detection section 250 includes an open/close detection sensor 151 for detecting an open/close state of the mobile communication terminal 20, and a rotation detection sensor 152 for detecting a rotational angle about the Z-axis of the housing 20A, and detects the style of the mobile communication terminal 20 based on detection information of these sensors.

The connector section 260 is a connector for making connection between the cradle 21 and this connector section and includes a receiving terminal. The connector section 260 is paired with a feeding connector provided in the cradle 21, and these connectors are connected to each other, so that power is received from the cradle 21 and supplied to the power supply section 270 via the connector section 260.

The power supply section 270 includes a predetermined power circuit, a rechargeable buttery and the like, and charges the battery with the commercial power supplied via the connector section 260 connected to the cradle 21, and supplies power sent from the cradle 21 and power stored in the battery to each component of the mobile communication terminal 20.

The storage section 280 includes a predetermined storage device such as a ROM, a flash memory, etc., and stores data necessary for executing each processing and data generated by execution of each processing, in addition to operation programs executed by the control section 110. Particularly, in this embodiment, the storage section 280 stores setting information SI (to be specifically described) on the television reception function of the mobile communication terminal 20.

Figure 21:
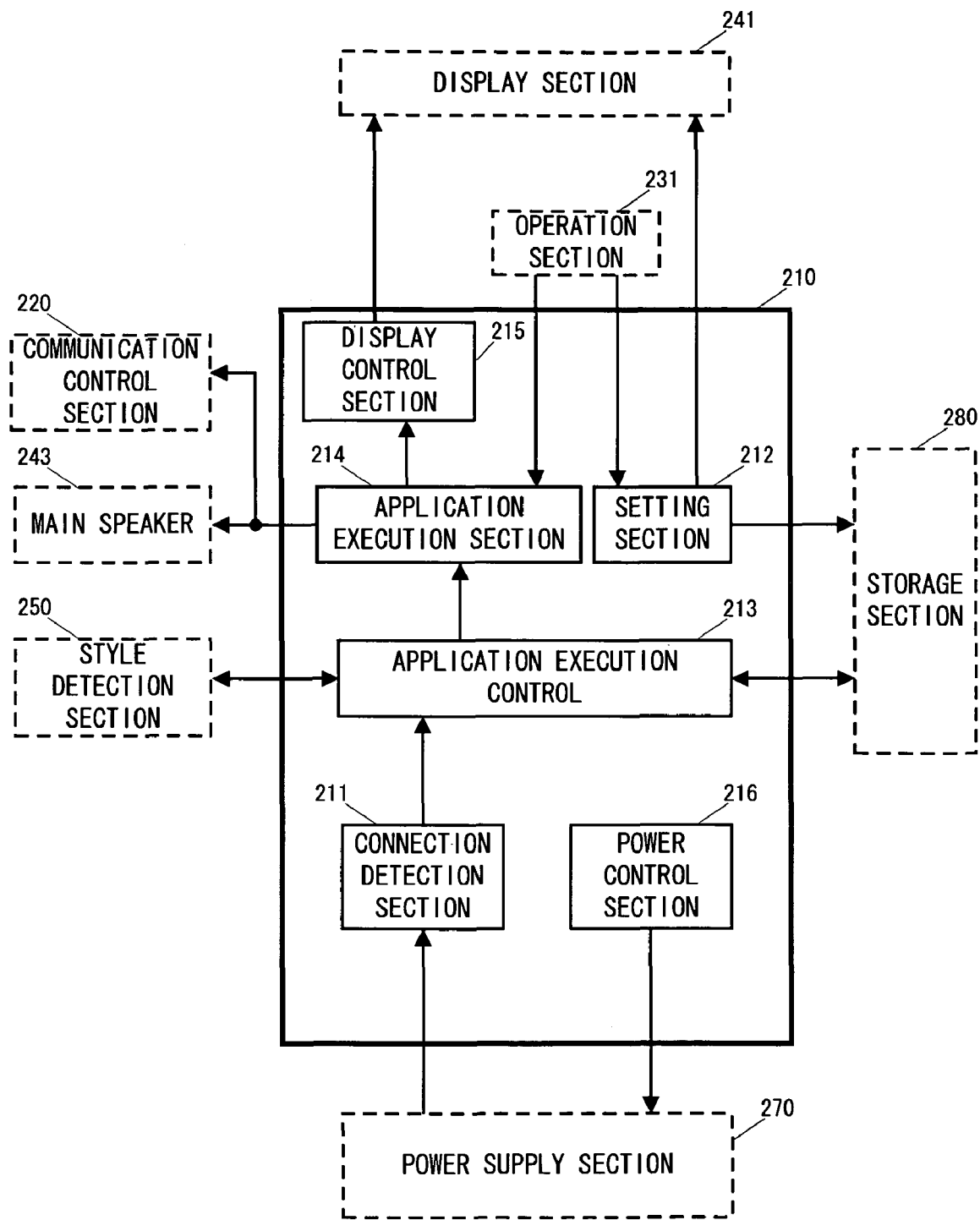
FIG. 21 is a functional block diagram showing a functional configuration implemented by a control section illustrated in FIG. 20.

The operation programs stored in the storage section 280 include an operation program for implementing each processing to be described later in addition to an arbitrary basic program that controls the base operation of the mobile communication terminal 20. The control section 210 executes these operation programs to thereby implement the below-described processing by the mobile communication terminal 20. Namely, execution of the operation programs stored in the storage section 280 causes the control section 210 to function as components as shown in FIG. 21. As shown in the figure, the control section 210 functions as a connection detection section 211, a setting section 212, an application control section 213, an application execution section 214, a display control section 215, and a power control section 216.

The connection detection section 211 detects connection and disconnection between the mobile communication terminal 20 and the cradle 21 in cooperation with the power supply section 270.

The setting section 112 performs processing on various settings (hereinafter referred to as "application setting") relating to the execution of application in cooperation with the operation section 231 and the storage section 280. The setting section 212 creates setting information S1 based on the user operation of the operation section 231, changes setting, and stores the result in the storage section 280. It should be noted that the setting section 212 creates various screens necessary for application setting and causes the result to be displayed on the display section 241. In this embodiment, the user sets which application should be automatically started up (automatic start-up setting) when the mobile communication terminal 20 is connected to the cradle 21.

The application control section 213 causes the application execution section 214 to execute the application according to the style of the mobile communication terminal 20 and the setting information S1 in cooperation with the style detection section 250 and the storage section 280.

The application execution section 214 is one that executes an application which is exactable by the mobile communication terminal 20. In this embodiment, the application execution section 214 executes the application based on control made by the application control section 213 upon connection to the cradle 21. Here, in the mobile communication terminal 20 according to this embodiment, various functions except the voice call function as the basic function are implemented by the applications, and the control section 210 executes the program for each application to thereby perform the operation of each application. In this embodiment, for example, functions such as a television reception function, a radio reception function, an audio playback function (music playback function), a slide show function, a standby screen display function, etc., are implemented by the applications. Accordingly, the application programs for these functions are stored in the storage section 280 and the control section 210 executes these programs to thereby implement the respective applications.

The display control section 215 controls the display screen of the display section 241 based on the application executed by the application execution section 214 and the style of the mobile communication terminal 20 detected by the style detection section 250 in corporation with the output section 240. Particularly, in this embodiment, the display control section 215 controls the screen display direction.

The power control section 216 controls the power supply section 270 based on the setting information SI to turn on and off the mobile communication terminal 20.

In this embodiment, the aforementioned functional configuration is logically implemented by the control section 210. However, the aforementioned functions are configured by a dedicated circuit such as an ASIC, so that these functions may be implemented by the physical configuration. Moreover, execution condition information C1, which indicates an execution condition of each application, is prestored in the storage section 280. In this embodiment, the execution conditions of applications, which are started by the application automatic start-up setting by the user, are shown.

FIG. 22 shows an example of execution condition information C1 stored in the storage section 280. For example, regarding the television reception function that needs the screen display, the execution condition is chosen where connection to the cradle 21 is made such that the display screen faces front. Similarly, regarding the slide show function that needs the screen display, the execution condition is chosen where the display screen faces front. On the other hand, regarding the audio playback function that needs the sound output, the execution condition is chosen where connection to the cradle 21 is made such that the main speaker faces front. Similarly, regarding the radio reception function that needs the sound output, the execution condition is chosen where the main speaker faces front.

In addition, as shown in FIG. 22, an automatic start-up flag is added to the execution condition information C1. Regarding the automatic start-up flag, when an application, which is automatically started up upon connection to the cradle 21, is set by the setting section 212, the flag corresponding to the relevant application is set (flag value 0→1).

Moreover, option setting information for each application is recorded in the execution condition information C1. The option setting information indicates an operation setting for automatically starting the application in which the automatic start-up flag is set, and setting is given thereto according to the application. For example, regarding the applications for the television reception function and the radio reception function, a channel that is received at the automatic start-up time is set. Moreover, regarding the applications for the audio playback function and the slide show function, storage locations for sound data and image data, which are reproduced at the automatic start-up time, are set.

Namely, addition of the automatic start-up flag or option setting information allows execution condition information C1 to function as setting information (hereinafter referred to as "setting information S1") indicating application setting.

The aforementioned components of the mobile communication terminal 20 are those necessary for implementing the present invention, and other components necessary for the basic functions as the mobile communication terminal and components necessary for various additional functions may be provided as required.

Figure 23:
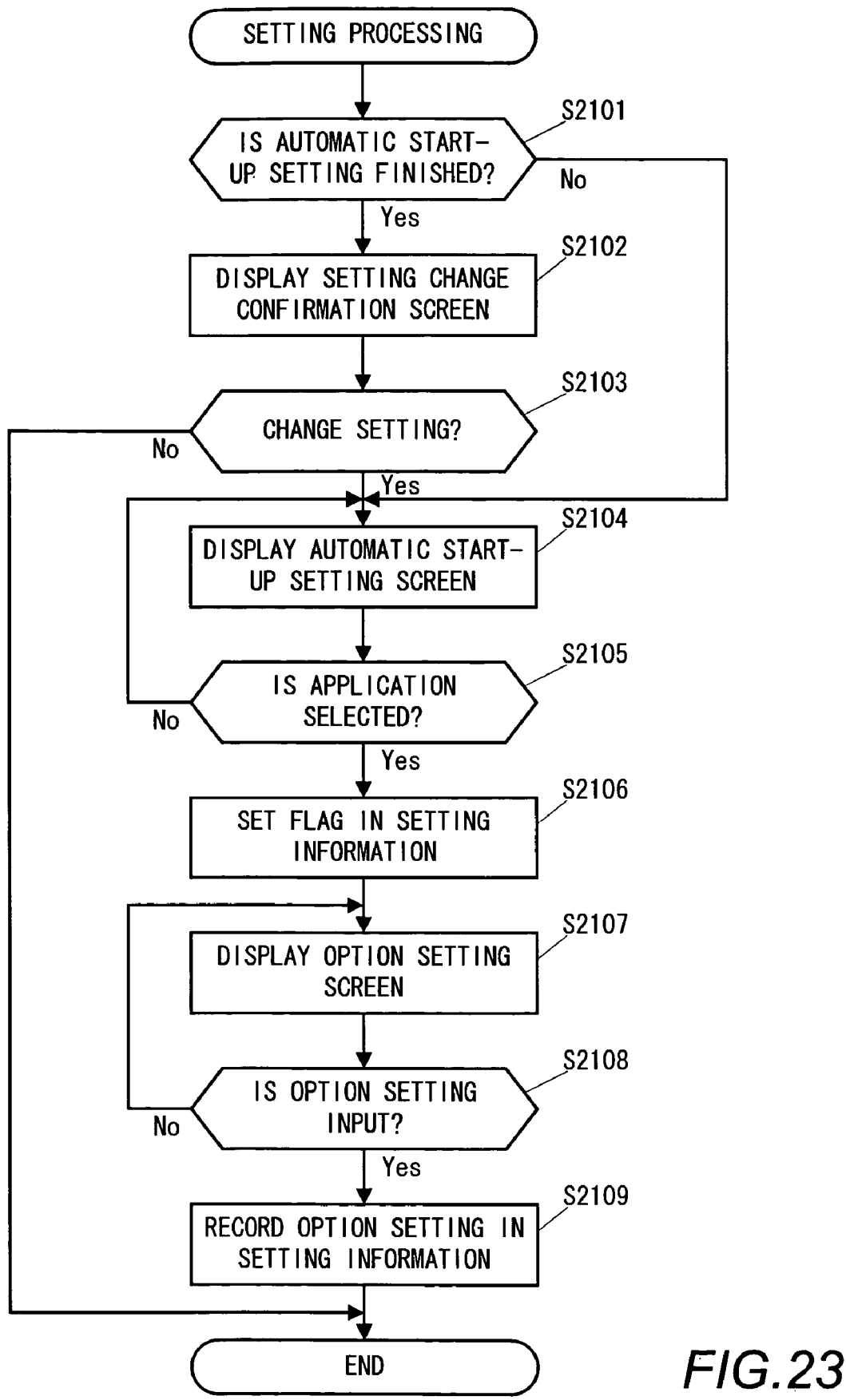
FIG. 23 is a flow chart explaining "setting processing" according to the second embodiment of the present invention.

The following will explain the operation of the above-configured mobile communication terminal 20. First, "setting processing", which is executed when the mobile communication terminal 20 performs the application setting, will be explained with reference to a flow chart shown in FIG. 23.

This "setting processing" is started at the time when the user operates the operation section 231 to instruct the start of setting.

When processing is started, the setting section 212 gains access to execution condition information C1 (=setting information S1) of the storage section 280 and determines whether an automatic start-up flag is set indicating an application to be automatically started up when the mobile communication terminal 20 is connected to the cradle 21. In other words, it is determined whether an automatic start-up application is already set (step S2101).

Figure 24A:
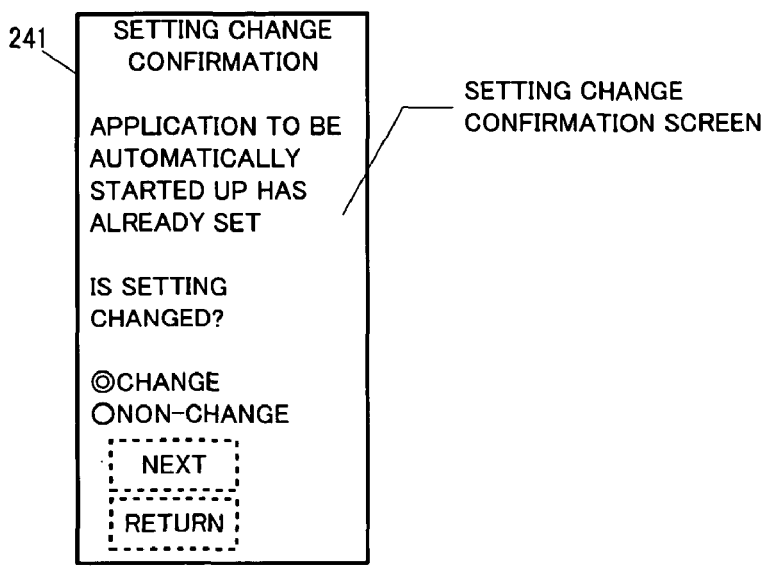
FIG. 24A is a view showing a display example of a "setting change confirmation screen"
Figure 24B:
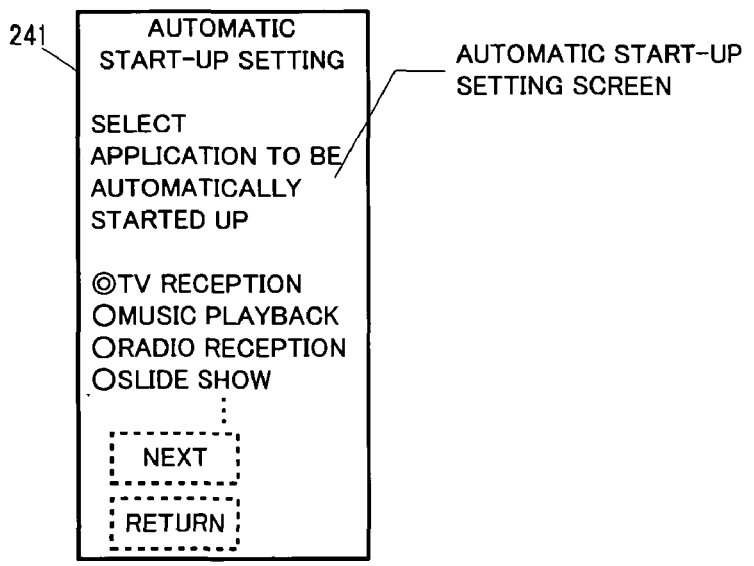
FIG. 24B is a view showing a display example of an "automatic start-up setting screen"
Figure 24C:
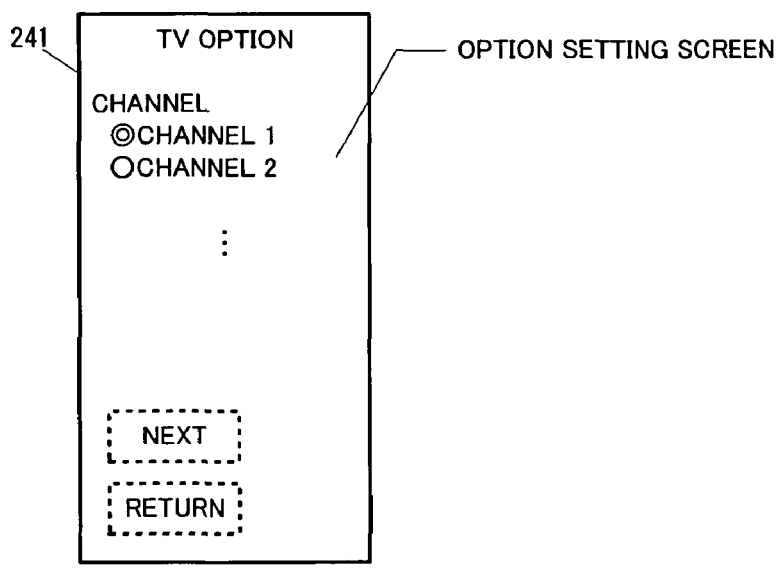
FIG. 24C is a view showing a display example of an "option setting screen"

When the automatic start-up application is already set (step S2101: Yes), the setting section 212 creates a "setting change confirmation screen" (FIG. 24) to inquiry of the user about whether the set automatic start-up setting should be changed, and displays the created "setting change confirmation screen" on the displays section 241 (step S2102).

The user operates the operation section 231 and selects "Yes" when he/she desires to change the setting, and selects "No" when he/she does not desire to change the setting. The setting section 212 determines whether the user will change setting based on the input from the operating section 231 (step S2103). When the user will not change the setting (step S2103: No), processing is directly ended.

When the user will change the setting (step S2103: Yes) or the automatic start-up application is not set (step S2101: No), the setting section 212 displays an "automatic start-up setting screen" for causing the user to select the automatic start-up application (FIG. 24B) on the display section 241 (step S2104).

When the user operates the operating section 231 and selects an application which he/she desires to automatically start up upon connection to the cradle 21. When the user selects the application based on the input from the operation section 231 (S2105: Yes), the setting section 212 gains access to execution condition information C1 (=setting information S1) of the storage section 280 to set the automatic start-up flag corresponding to the selected application (0→1) (step S2106).

When the application to be automatically started up is set, the setting section 212 displays an "option setting screen" for causing the user to set the option setting concerning the selected application (FIG. 24C) on the display section 241 (step S2107).

The user operates the operation section 231 and inputs the option setting on the selected application. When the user inputs the option setting based on the input from the operation section 231 (S2108: Yes), the setting section 212 gains access to execution condition information C1 (=setting information S1) of the storage section 280 to record the input option setting (step S2109), and processing is ended.

Accordingly, setting information SI, which indicates the application to be automatically started up that the user desires and the option setting, is stored in the storage section 280.

Figure 25:
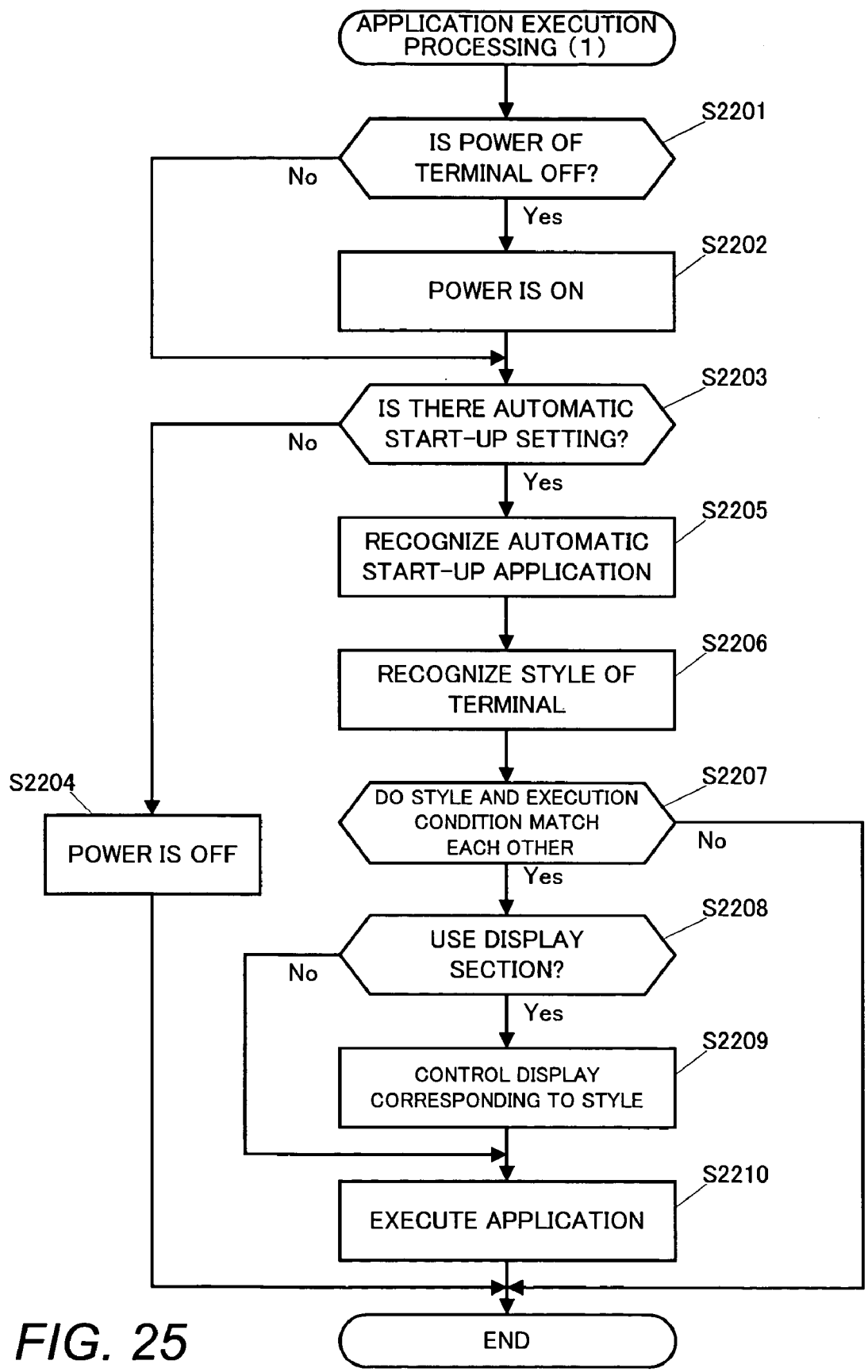
FIG. 25 is a flow chart explaining "application execution processing (1)" according to the second embodiment of the present invention.

An explanation will be next given of the operation of the mobile communication terminal 20 when connection to the cradle 21 is made. Herein, "application execution processing (1)", which is executed by the control section 210 of the mobile communication terminal 20 upon connection to the cradle 21, will be explained with reference to a flow chart shown in FIG. 25. This "application execution processing (1)" is started at the time when the mobile communication terminal 20 is connected to the cradle 21. In other words, the "application execution processing (1)" is started at the time when the connection detection section 211 detects connection between the connector portion 260 of the mobile communication terminal 20 and the feeding connector of the cradle 21.

In this case, when power feeding from the cradle 21 is started by connection between the connectors and power is supplied to the power supply source 270 from the connector portion 260, the power supply source 270 notifies the control section 210 of the power supply. The connection detection section 211 detects that the mobile communication terminal 20 is connected to the cradle 21 based on the notification from the power supply section 270.

When connection to the cradle 21 is detected and processing is started, the power control section 216 determines whether power of the mobile communication terminal 20 is turned off (step S2201). When power of the mobile communication terminal 20 is turned off (step S2201: Yes), the power control section 216 turns off power of the mobile communication terminal 20 (step S2202). In other words, when the power-off mobile communication terminal 20 is connected to the cradle 21, the mobile communication terminal 20 is automatically turned on.

When the application control section 213 gains access to the setting information S1 of the storage section 280 and determines whether an application automatic start-up setting is made, namely, there is a setting in which the automatic start-up flag is set (step S2203).

When the application automatic start-up setting is not made (step S2203: No), the power control section 216 instructs the power supply section 270 to turn off the mobile communication terminal 20. In this case, the power supply section 270 turns off power of the mobile communication terminal 20 in accordance with the instruction from the power control section 216 (step S2204), and processing is ended. Namely, when the mobile communication terminal 20 in which the application to be automatically started up is not set is connected to the cradle 21, power of the mobile communication terminal 20 is automatically turned off. In this case, the mobile communication terminal 20 performs charging to the battery of the power supply section 270.

On the other hand, when the application automatic start-up setting is made (step S2203: Yes), the application control section 213 recognizes to which application the automatic start-up setting is made based on the setting information S1 (step S2205).

The application control section 213 inquiries of the style detection section 250 about in which style the mobile communication terminal 20 is currently formed. The style detection section 250 notifies the application control section 213 of information (hereinafter referred to as "style information") indicating the style of the mobile communication terminal 20 detected based on detection signals from the open/close detection sensors 151 and the rotation detection sensor 152 in response to the inquiry from the application control section 213.

The application control section 213 obtains the style information from the style detection section 250, thereby recognizing the current style of the mobile communication terminal 20, namely, the style of the mobile communication terminal 20 connected to the cradle 21 (step S2206).

The application control section 213 gains access to the execution condition information C1 of the storage section 280 and determines whether the style recognized in step S2206 matches the application execution condition recognized in step S2205 (step S2207).

Namely, the application control section 213 judges the physical direction of the mobile communication terminal 20 connected to the cradle 21 in each style, and determines whether the relevant style matches the application execution condition set in the execution condition information C1 based on the judgment result.

For example, in executing the application, which mainly provides the screen display such as the television reception function, slide show function, etc., the display screen (display section 241) must be directed to the user (display screen faces front). Accordingly, in the case where the mobile communication terminal 20 and the cradle 21 are connected to each other so that the connector portion 260 of the mobile communication terminal 20 is engaged with the feeding connector of the cradle 21 (namely, connection is made in a normal connection direction), if the style of the mobile communication terminal 20 is an open style or view style, the execution condition is satisfied.

On the other hand, in executing the application, which mainly provides the sound reproduction such as the audio playback function, the radio reception function, etc., the sound direction of the main speaker 243 must be directed to the user. Accordingly, in the case where the mobile communication terminal 20 and the cradle 21 are connected to each other in the normal connection direction, if the style of the mobile communication terminal 20 is a reverse-open style, the execution condition is satisfied.

The application control section 213 determines whether the application to which the automatic start-up setting is made is executable based on the execution condition for each application and the current style of the mobile communication terminal 20.

When the current style of the mobile communication terminal 20 matches the execution condition of the application to which the automatic start-up setting is made and the application is executable (step S2207: Yes), the application control section 213 further determines whether the relevant application is one that provides the relevant screen display, namely, whether the display section 241 is used (step S2208).

When the application is one that mainly provides the screen display, namely, the application for the television reception function or slide show function (step S2208: Yes), the display control section 215 decides a display direction based on the style of the mobile communication terminal 20 determined in step S2206, and controls the display section 241 to perform the screen display in the relevant display direction (step S2209).

Namely, in this embodiment, the execution condition of the application, which provides the screen display, corresponds to the open style or view style. However, there is a difference in the screen direction (aspect ratio) between the open style and the view style. Accordingly, the display control section 215 controls the display section 241 to obtain the display direction that matches the screen direction of the display section 241 in the current style of the mobile communication terminal 20.

If the application to be executed is one that uses the display section 241 as mentioned above, the application control section 213 instructs the application execution section 214 to start the execution of the relevant application after performing the display control. If the application to be executed is one that does not use the display section 241 (step S2208: No), the application control section 213 instructs the application execution section 214 to start the execution of the relevant application without performing the display control. The application execution section 214 executes the relevant application according to the instruction of the application control section 213 (step S2210), and processing is ended. At this time, the application execution section 214 gains access to the setting information SI of the storage section 280 to perform an operation based on the option setting set in the relevant application. For example, if the channels are set to the application that provides the television reception function or the radio reception function, the application execution section 214 selects the relevant channel and starts the reception. Moreover, if reproducing data is set to the application that provides the audio playback function or the slide show function, the application execution section 214 gains access to the relevant data to start reproduction.

As explained above, according to the mobile communication terminal 20 of this embodiment, the preset application is automatically executed upon connection to the cradle 21.

In this case, only when the style of the communication terminal 20 connected to the cradle 21 is a style, which is suitable for executing the set application, the relevant application is executed, so that the application can be executed in an appropriate state. In other words, the user changes the style of the mobile communication terminal 20 upon connection to the cradle 21, thereby making it possible to select whether the set application should be automatically started up. Accordingly, it is possible to execute a desired operation without performing a precision operation.

In addition, the style of the mobile communication terminal 20 may be brought into correspondence with each application as the application execution condition.

In this case, execution condition information C2 as shown in FIG. 26A may be stored in the storage section 280. As shown in the figure, in the execution condition information C2 according to this embodiment, the application, which is started up by the mobile communication terminal 20, is set for each holdable style. For instance, a "standby screen display application" is set regarding the "open style", an "audio playback application" is set regarding the "reverse-open style", and a "television reception application" is set regarding the "view style." In addition, any application is not set to the "close style."

Furthermore, setting information S2, which represents application settings that indicate the respective application operation settings, is stored in the storage section 280. An example of the setting information S2 is shown by FIG. 26B. As shown in the figure, in the setting information S2, option setting information of each application is recorded. This option setting is the same as that shown in FIG. 22. Accordingly, it is assumed that the same processing as the aforementioned "setting processing" is performed, thereby causing the user to carry out the option setting of each application.

Figure 27:
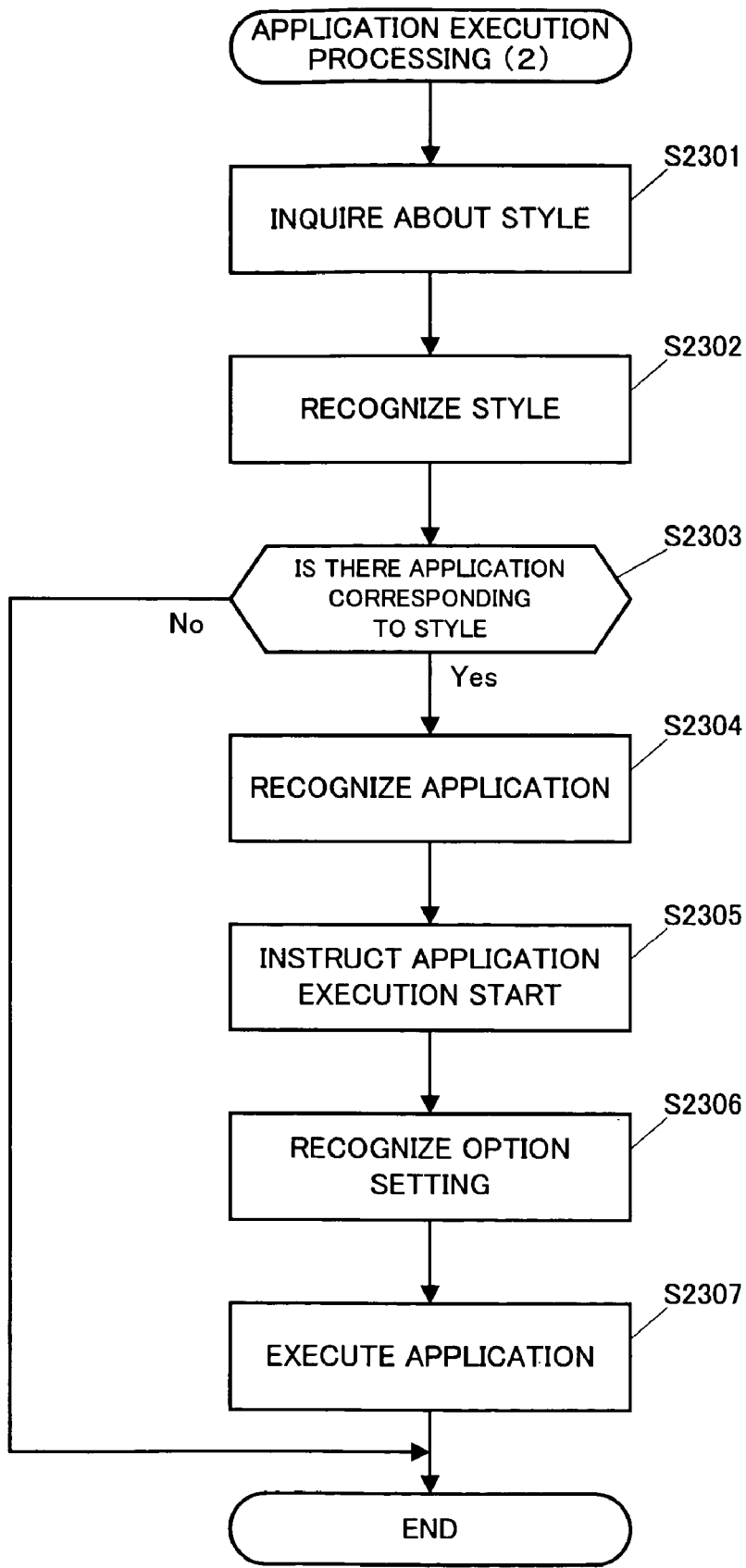
FIG. 27 is a flow chart explaining "application execution processing (2)" according to the second embodiment of the present invention.
Figure 28:
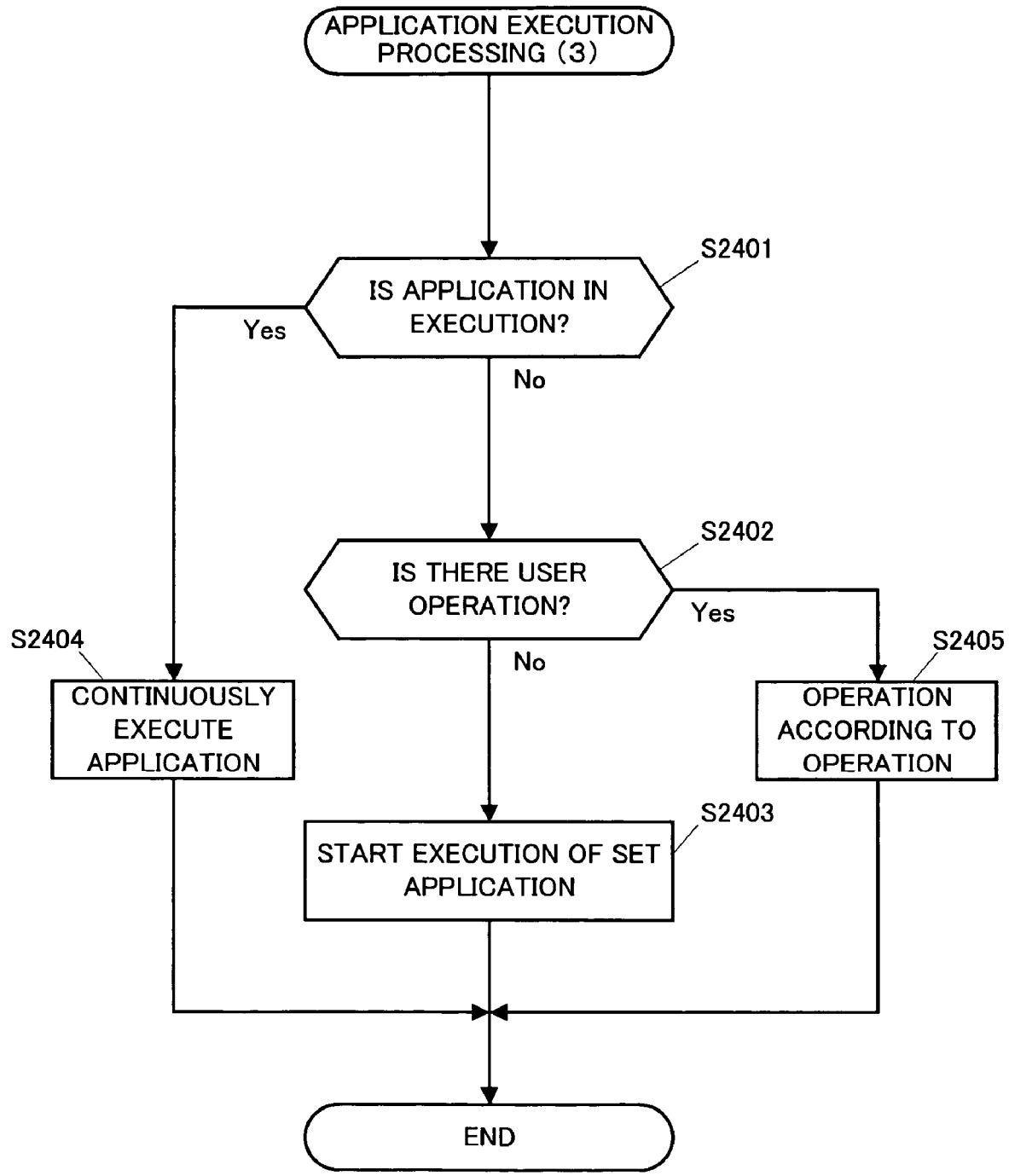
FIG. 28 is a flow chart explaining "application execution processing (3)" according to the second embodiment of the present invention.

The following will explain "application execution processing (2)" using the execution condition information C2 and setting information S2 with reference to a flow chart shown in FIG. 27. This processing is started at the time when the mobile communication terminal 20 is connected to the cradle 21.

When processing is started, the application control section 213 inquires of the style detection section 250 about the current style of the mobile communication terminal 20 (S2301).

The style detection section 250 notifies the application control section 213 of style information indicating the style of the mobile communication terminal 20 detected based on the detection signal from the open/close detection sensor 151 and the rotation detection sensor 152 in response to the inquiry from the application control section 213.

The application control section 213 recognizes the current style of the mobile communication terminal 20 based on the notification from the style detection section 250 (step S2302).

Next, the application control section 213 gains access to the execution condition information C2 of the storage section 280 and determines whether the application is made to correspond to the style recognized in step S2302 (step S2303).

When no application corresponding to the current style of the mobile communication terminal 20 is set (step S2303: No), processing is directly ended. In this case, the mobile communication terminal 20 performs charging to the battery of the power supply section 270.

On the other hand, when the application corresponding to the current style of the mobile communication terminal 20 is set (step S2303: Yes), the application control section 213 recognizes which application corresponds to the current style of the mobile communication terminal 20 (step S2304).

When recognizing the application to be started up, the application control section 213 instructs the application execution section 214 to start execution of the relevant application (S2305). The application execution section 214 accesses the setting information S2 of the storage section 280 in accordance with the instruction from the application control section 213 and recognizes the option setting on the recognized application (step S2306).

The application execution section 214 executes the application recognized in step S2304 based on the option setting recognized in step S2306 (step S2307) and processing is ended.

By the aforementioned processing, the predetermined application, which is appropriate for the style of the mobile communication terminal connected to the cradle 21, is automatically executed.

When there is an application in execution when the connection between the mobile communication terminal 20 and the cradle 21 is made, the relevant application may be continuously executed on a priority basis. An example of the operation of the mobile communication terminal 20 in this case will be explained as follows.

The following will explain "application execution processing (3)" executed by the mobile communication terminal 20 with reference to a flow chart shown in FIG. 27. This processing is also started at the time when the mobile communication terminal 20 is connected to the cradle 21.

When processing is started, the application control section 213 determines whether the application is being executed by the application execution section 214 (step S2401).

When the application is not being executed by the application execution section 214 (step S2401: No), the application control section 213 further determines whether a user operation is made based on the presence or absence of the input signal from the operation section 231 (step S2402).

When the user operation is not made (step S2402: No), the application execution section 214 executes the application based on the setting information of the storage 280 and the style of the mobile communication terminal 20 (step S2403), and processing is ended. In this case, the same processing as the aforementioned "application execution processing (1)" and "application execution processing (2)" is executed, so that the application is executed according to the current style of the mobile communication terminal 20 and the setting contents. More specifically, recognition as to which application should be executed and determination as to whether the relevant application is executable are performed by the application control section 213, and the application execution section 214 executes the application according to the instruction from the application control section 213.

On the other hand, when the application is being executed when the mobile communication terminal 20 is connected to the cradle 21 (step S2401: Yes), the application execution section 214 continues to execute the relevant application (step S2404), and processing is ended.

Moreover, when the user operation is made when the mobile communication terminal 20 is connected to the cradle 21 (step S2402: Yes), the control section 210 performs the relevant operation (step S2405), and processing is ended.

By the aforementioned processing, the execution of the relevant application is continued when the mobile communication terminal 20 where the application is running is connected to the cradle 21. Moreover, when the user operation is made, the operation is executed according to the relevant operation. Accordingly, even when the automatic start-up application is set, a higher priority can be given to the relevant operation than to the other operation. This prevents the application from being changed to the other application to which the automatic start-up setting is made even when the mobile communication terminal 20 is connected to the cradle 21 to be used with a stable power by the commercial power supply while, for example, the application is executed during the portable use of the mobile communication terminal 20.

As explained above, according to the second embodiment, the appropriate application is automatically executed when the mobile communication terminal 20 is connected to the cradle 21, thereby making it possible to increase user convenience. In this case, the appropriate application is executed according to the style of the mobile communication terminal 20 connected to the cradle 20, so that the mobile communication terminal 20 can be operated to make full use of the performance of each function.

Each of the aforementioned embodiments is one example and is not limited to the present invention described in the claims. Moreover, various modifications and applications can be made without departing from the scope of the invention.

For instance, in the first embodiment, either one of setting modes is selected. However, a plurality of setting modes may be set. In this case, for example, reception of a default channel set in the channel mode and acquisition of program guide data may be simultaneously executed when the mobile communication terminal 10 and the cradle 11 are connected to each other.

Furthermore, in the first embodiment, default channel setting and timer setting are alternatively set. However, both settings may be taken. In this case, for instance, when the mobile communication terminal 10 and the cradle 11 are connected to each other, the operation can be performed so that the reception of the default channel is started, and thereafter the reception is changed to the channel where the reception start time zone is designated.

Furthermore, in the first embodiment, program guide data, which indicates the program being broadcasted at the time when the mobile communication terminal 10 and the cradle 10 are connected to each other, is acquired. However, program guide data relating to the other time zone may be acquired. Additionally, in the first embodiment, at the time when the mobile communication terminal 10 and the cradle 11 are connected to each other, access is made to the program guide providing site to acquire program guide data. However, program guide data is acquired in advance and stored in the storage section 180. In this case, when program guide acquisition processing is started, a program guide is displayed based on program guide data stored in the storage section 180 and a program may be selected by the user.

The contents of setting shown in the first embodiment are explained by way of example. If the contents relate to the setting on the television reception operation, any setting contents may be included. For instance, if the mobile communication terminal 10 has a recording function for a television broadcast, a setting relating to a recording operation for a television broadcast may be made.

Moreover, in the timer setting in the first embodiment, the reception start time zone is selected and designated. However, the present invention is not limited to this, and if the time when the reception is started can be designated, the reception start time zone may be designated in any method. For instance, the reception start time may be designated by user input of numeric values. Furthermore, for example, designation of a reception end time may be included in setting information in addition to the reception start time. In this case, the reception control section 113 may stop the reception operation by the television reception section 123 when the time reaches the designated reception end time.

In the first embodiment, the television reception operation is stopped at the time when the connection between the mobile communication terminal 10 and the cradle 11 is released. However, the television reception operation may be continued after the connection therebetween is released.

Moreover, in the first embodiment, the foldable mobile communication terminal 10 is mounted on the cradle 11 while being folded. However, if the mobile communication terminal 10 can receive and output a television broadcast to be viewable by the user while being connected to the charging base (cradle), the mobile communication terminal 10 may be arbitrarily formed. For example, the mobile communication terminal 10 may be mounted on the cradle 11 while being unfolded, or housings, which are not foldable (e.g., straight type or slide type), may be used.

Furthermore, in the first embodiment, connection between the mobile communication terminal 10 and the cradle 11 is detected based on the connection between the connector section 160 of the mobile communication terminal 10 and the feeding connector of the cradle 11. However, any detection method may be used without being limited to this. For instance, connection between the mobile communication terminal 10 and the cradle 11 may be detected based on connection to a connector (e.g., data communication connector for connection to a personal computer, etc.,) excepting the connectors for power. Or, a predetermined sensor is provided to the mobile communication terminal 10 or the cradle 11, thereby detection may be set that mobile communication terminal 10 is mounted on the cradle 11.

Furthermore, the kind of application and setting contents shown in the second embodiment 2 are explained by way of example. However, if they relate to the operation executable by the mobile communication terminal 20, any applications and setting contents may be included. For example, if the mobile communication terminal 20 is provided with a camera function, the application relating to the camera function may be automatically started up based on the style relevant to the direction of a lens placed on the housing of the mobile communication terminal 20. Or, for instance, if the mobile communication terminal 20 is connected to the cradle 21 in view style, a web display application (browser) may be automatically started up in such a way to display a web page on a screen in landscape orientation.

In the second embodiment, the application is automatically started up at the time when the mobile communication terminal 20 and the cradle 21 are connected to each other. However, for instance, the operation of the executed application may be finished at the time when connection between the mobile communication terminal 20 and the cradle 21 is released. In other words, when the connection is released, power feeding from the cradle 21 is stopped and the mobile communication terminal 20 is driven by the battery. However, in this case, the execution of the application is ended, thereby making it possible to save battery consumption. In addition, regarding the release of the connection to the cradle 21, the power supply section 270 notifies the connection detection section 211 of the stop of power feeding from the cradle 21, so that the connection detection section 211 can detect the release of the connection to the cradle 21.

In the second embodiment, when the mobile communication terminal 20 where the application is running is connected to the cradle 21, the execution of the application is continued. However, if the application in execution is different from the application to which the automatic start-up setting is made, the application may be changed to the application to which the automatic stat-up setting is made.

Moreover, in the second embodiment, the double-axis foldable mobile communication terminal 20 is explained by way of example. However, if multiple styles (forms) of the mobile communication terminal 20 can be held by the housings, any type (e.g., slide type) may be used.

Additionally, in the second embodiment, arrangement of the housings and components (display section 241, main speaker 243, etc.,) used in executing the application are shown by way of example, and any arrangements may be possible. Namely, the execution condition information and setting information are prepared according to these arrangements, thereby making it possible to apply the present invention to various forms of the mobile communication terminals. Moreover, even if each of the execution condition information and setting information are preset by the manufacturer of the mobile communication terminal 20, they may be arbitrarily set by the user.

Furthermore, in the second embodiment, the connection between the mobile communication terminal 10 and the cradle 11 is detected based on the connection between the connector section 260 of the mobile communication terminal 20 and the feeding connector of the cradle 21. However, any detection method may be used without being limited to this. For instance, the connection between the mobile communication terminal 20 and the cradle 21 may be detected based on connection to a connector (e.g., data communication connector for connection to a personal computer, etc.,) excepting the connectors for power. Or, a predetermined sensor is provided to the mobile communication terminal 20 or the cradle 21, thereby detection may be set that mobile communication terminal 20 is mounted on the cradle 21.

Furthermore, the present invention can be implemented by the mobile communication terminal having the configuration relating to the present invention in advance as in each of the above-explained embodiments. In addition to this, the present invention can be implemented by applying a program to the existing mobile communication terminal.

In this case, by applying a program, which causes a computer (e.g., CPU) that controls the existing mobile communication terminal to function as the respective functional components implemented by the control sections 110 and 210 of the aforementioned embodiments, the existing mobile communication terminal is allowed to function as the mobile communication terminals 10 and 20 of the aforementioned embodiments. Namely, the same operation program as the operation program executed by the control sections 110 and 210 of the aforementioned embodiments is installed to the storage device of the existing mobile communication terminal and the control device (CPU) of the mobile communication terminal executes this program, thereby allowing the device to function as the mobile communication terminal of the present invention.

The form, which provides such the program, is arbitrarily set. For example, the program is distributed via a communication medium such as the Internet to make it possible to provide the program. In addition to this, the program is stored in a predetermined storage medium (e.g., memory card) to make it possible to provide the program.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-226327 filed on Aug. 4, 2005 and Japanese Patent Application No. 2005-233571 filed on Aug. 11, 2005 and including specification, claims, drawings and summary. The disclosure of the above Japanese Patent Applications is incorporated herein by reference in its entirety.

What is claimed is:

1. A mobile communication terminal having a reception section that receives a television signal, comprising:
   a setting section configured to set automatic channel selection or automatic acquisition of program guide information as an operation to be automatically performed whenever the mobile communication terminal is connected to a cradle;
   a setting storage section for storing setting information representing the operation that is set by the setting section;
   a first determining section configured to determine whether the setting information is stored in the setting storage section upon detecting that the mobile communication terminal is connected to the cradle;
   a second determining section configured to determine whether the setting information representing the operation to be performed is the automatic channel selection when the first setting section determines that the setting information is stored in the setting storage section;
   a receiving section configured to select a predetermined channel, receive a television signal through the predetermined channel, and further configured to output the received television signal when the second determining section determines that the setting information represents the automatic channel selection as the operation to be performed; and
   a program guide information display section configured to acquire program guide information at a current time and to display the program guide based on the acquired program guide information when the second determining section determines that the setting information representing the operation to be performed is not the automatic channel selection.

2. The mobile communication terminal according to claim 1, wherein the receiving section stops outputting received data when the mobile communication terminal is released from the cradle while outputting the television signal received through the channel selected in response to the detection of the connection to the cradle.

3. A mobile communication terminal having at least a reception section that receives a television signal, comprising:
   a setting section configured to set first receiving channels to be selected in respective time bands or a second receiving channel to be selected irrespective of the time bands;
   a setting storage section for storing setting information representing the setting that is set by the setting section;
   a determining section configured to determine which of the setting information representing the first receiving channels and the setting information representing the second receiving channel is stored in the setting storage section upon detecting that the mobile communication terminal is connected to a cradle; and
   a receiving section configured to select a first receiving channel corresponding to a current time and to receive the television signal through the first receiving channel when the determining section determines that the setting information represents the first receiving channel, and further configured to select the second receiving channel and receive the television signal through the second receiving channel when the determining section determines that the setting information represents the second receiving channel.

4. The mobile communication terminal according to claim 3, wherein the receiving section stops outputting the received television signal when the mobile communication terminal is released from the cradle while outputting the television signal received through a selected channel in response to the detection of the connection to the cradle.

5. A computer-recordable medium encoded with a computer program which is executable by a computer to control receipt of a television signal, the computer program comprising:
   program code for setting, at a setting section, automatic channel selection or automatic acquisition of program guide information as an operation to be automatically performed whenever a mobile communication terminal is connected to a cradle;
   program code for storing, at a setting storage section, setting information representing the operation that is set by the setting section;
   program code for determining, at a first determining section, whether the setting information is stored in the setting storage section upon detecting that the mobile communication terminal is connected to the cradle;
   program code for determining, at a second determining section, whether the setting information representing the operation to be performed is the automatic channel selection when the first setting section determines that the setting information is stored in the setting storage section;
   program code for selecting, at a receiving section, a predetermined channel, for receiving a television signal through the predetermined channel, and for outputting the received television signal when the second determines section determines that the setting information represents the automatic channel selection as the operation to be performed; and
   program code for acquiring, at a program guide information display section, program guide information at a current time and for displaying the program guide based on the acquired program guide information when the second determining section determines that the setting information representing the operation to be performed is not the automatic channel selection.

6. A computer-readable medium encoded with a computer program executable by a computer to control receipt of a television signal, the computer program comprising:
   program code for setting, at a setting section, first receiving channels to be selected in respective time bands or a second receiving channel to be selected irrespective of the time bands;
   program code for storing, at a setting storage section, setting information representing the setting that is set by the setting section;

program code for determining, at a determining section, which of the setting information representing the first receiving channels and the setting information representing the second receiving channel is stored in the setting storage section upon detecting that the mobile communication terminal is connected to a cradle; and program code for selecting, at a receiving section, a first receiving channel corresponding to a current time and for receiving the television signal through the first receiving channel when the determining section determines that the setting information represents the first receiving channel, for selecting the second receiving channel and for receiving the television signal through the second receiving channel when the determining section determines that the setting information represents the second receiving channel.

* * * * *